(12) United States Patent
Nakaya et al.

(10) Patent No.: US 7,403,235 B2
(45) Date of Patent: Jul. 22, 2008

(54) INTEGRATED CIRCUIT AND INFORMATION SIGNAL PROCESSING APPARATUS HAVING MULTIPLE PROCESSING PORTIONS

(75) Inventors: Hideo Nakaya, Kanagawa (JP); Tetsujiro Kondo, Tokyo (JP)

(73) Assignee: Sony Corporation, Tokyo (JP)

( * ) Notice: Subject to any disclaimer, the term of this patent is extended or adjusted under 35 U.S.C. 154(b) by 869 days.

(21) Appl. No.: 10/762,996

(22) Filed: Jan. 22, 2004

(65) Prior Publication Data
US 2004/0153581 A1    Aug. 5, 2004

(30) Foreign Application Priority Data
Jan. 24, 2003   (JP) ............................ P2003-016462

(51) Int. Cl.
*H04N 7/01*   (2006.01)
*G06K 9/32*   (2006.01)

(52) U.S. Cl. ..................... 348/581; 348/458; 348/441; 382/298

(58) Field of Classification Search .................. 348/581, 348/458, 441; 382/277–281, 298–302, 304; 375/240.18–240.2, 240.25; 708/5, 190, 204–206, 708/208, 400–409
See application file for complete search history.

(56) References Cited

U.S. PATENT DOCUMENTS

| | | | |
|---|---|---|---|
| 4,739,390 A * | 4/1988 | Achiha et al. ............... 348/449 |
| 5,502,512 A * | 3/1996 | Toyoda et al. ............... 348/706 |
| 5,636,152 A * | 6/1997 | Yang et al. ................... 708/401 |
| 5,825,420 A * | 10/1998 | Yang et al. ............... 375/240.2 |
| 5,995,990 A * | 11/1999 | Henry ......................... 708/402 |
| 6,295,320 B1 * | 9/2001 | Lim et al. ................ 375/240.2 |
| 6,297,855 B1 * | 10/2001 | Kondo et al. ................ 348/663 |
| 6,356,310 B1 * | 3/2002 | Horishi et al. .............. 348/458 |
| 7,142,882 B2 * | 11/2006 | Schmidt ................... 455/552.1 |

FOREIGN PATENT DOCUMENTS

| | | |
|---|---|---|
| JP | 2002 218413 | 8/2007 |
| WO | WO 03 007155 | 1/2003 |

\* cited by examiner

*Primary Examiner*—Victor R Kostak
(74) *Attorney, Agent, or Firm*—Frommer Lawrence & Haug LLP; William S. Frommer; Thomas F. Presson

(57) ABSTRACT

An image signal processing apparatus having three processing portions. A first processing portion generates a motion class that corresponds to a target position in an output image signal based on an input image signal. A second portion generates a space class corresponding to the target position based on the input image signal and synthesizes the space class and the motion class to generate one class. A third portion selects multiple items of pixel data positioned in a periphery of this target position based on the input image signal and generates pixel data of the target position in the output image signal according to an estimate equation using the multiple items of pixel data and coefficient data corresponding to the class. These processing portions are respectively constituted of integrated circuits (ICs) having the same configuration. These ICs have first and second functional blocks. Each of the functional blocks changes its functionality according to setting.

8 Claims, 11 Drawing Sheets

FIG. 5
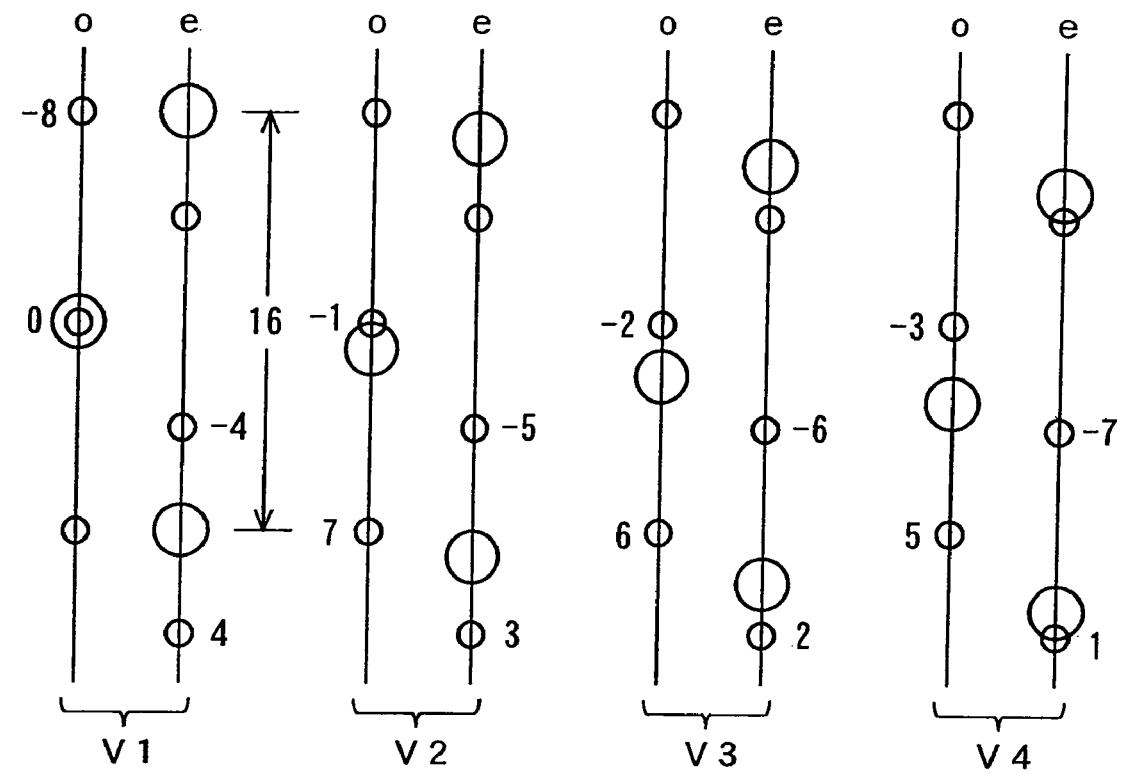
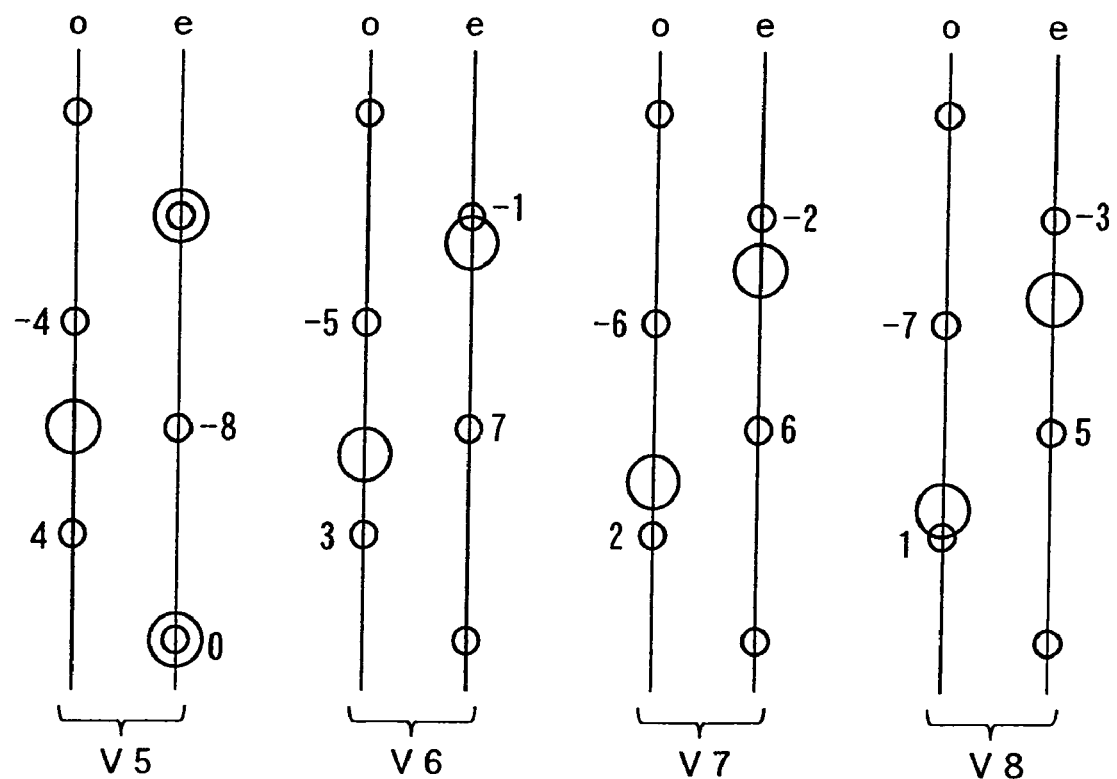

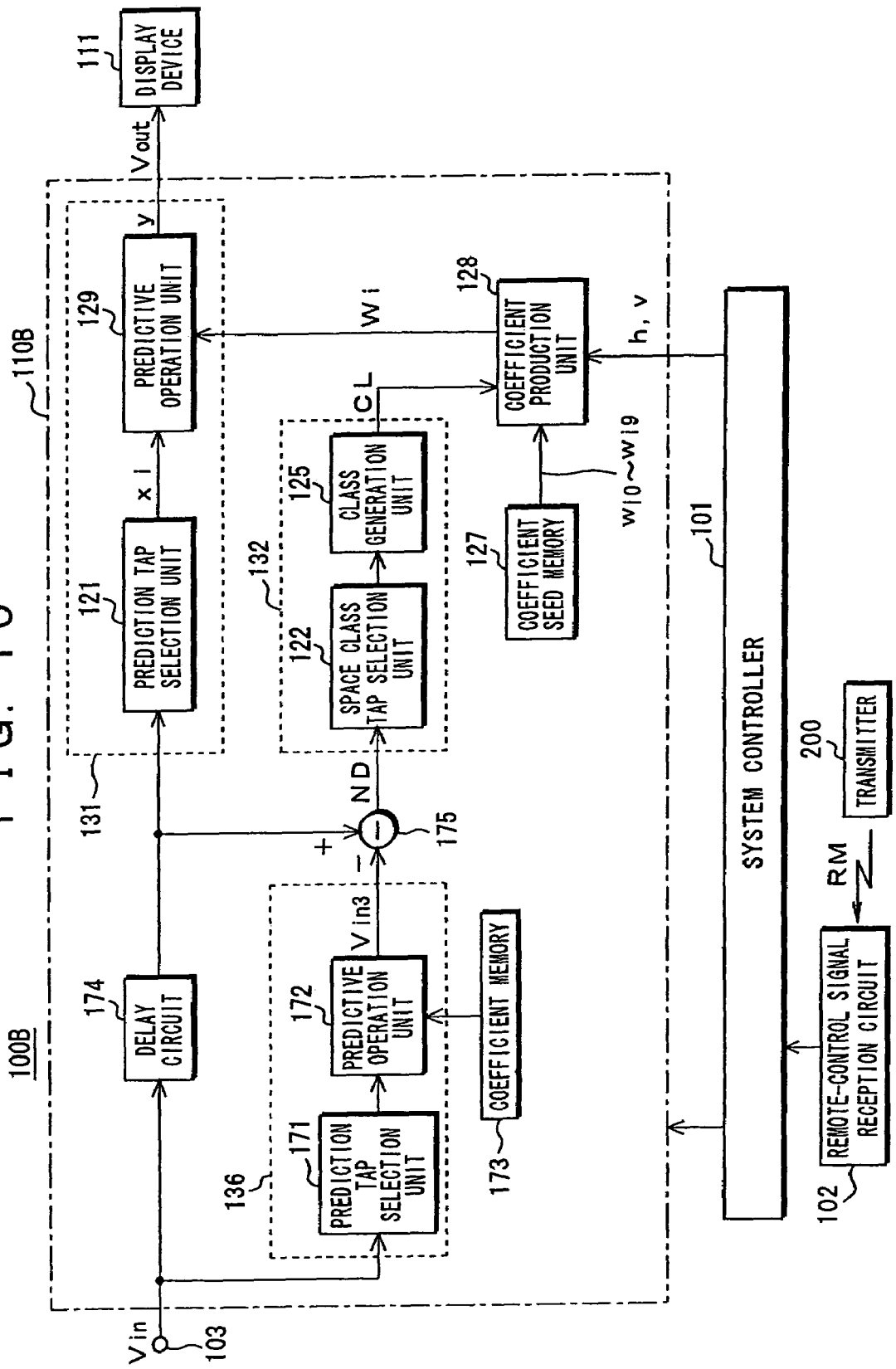

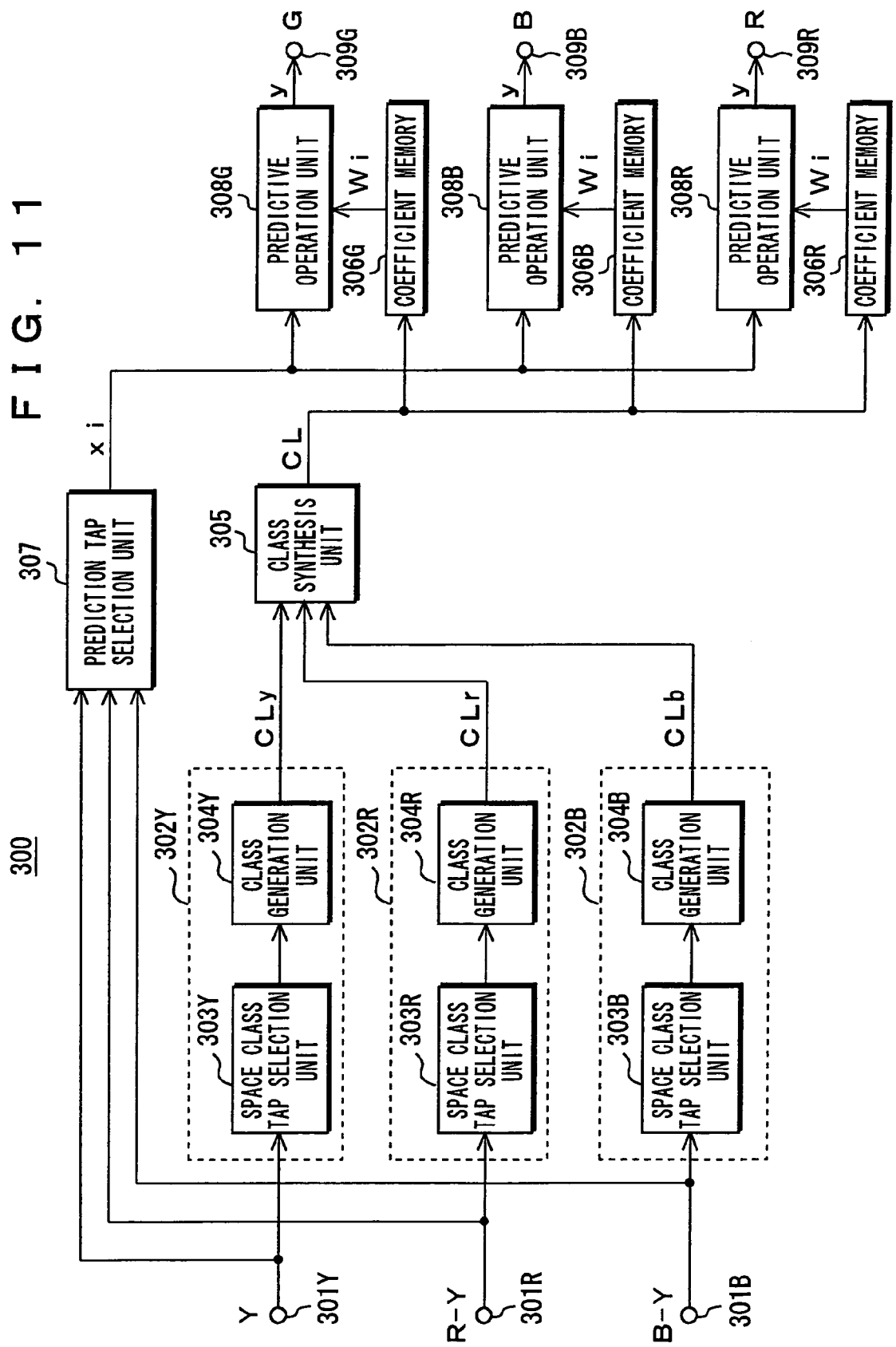

INTEGRATED CIRCUIT AND INFORMATION SIGNAL PROCESSING APPARATUS HAVING MULTIPLE PROCESSING PORTIONS

BACKGROUND OF THE INVENTION

1. Field of the Invention

The present invention relates to an integrated circuit (IC) and an information signal processing apparatus, and more specifically, it relates to an IC and the like suitable for being well applied to an apparatus for performing conversion of a format of, for example, an image signal, conversion of a scaling factor of an image, and the like.

2. Description of the Prior Art

Format conversion has conventionally been proposed by which, for example, a Standard Definition (SD) signal referred to as a 525i signal is converted into a High Definition (HD) signal referred to as a 1050i signal. The 525i signal refers to an interlaced image signal containing 525 lines, while the 1050i signal refers to an interlaced image signal containing 1050 lines.

FIG. 1 shows a relationship in pixel position between the 525i signal and the 1050i signal. In the figure, a large dot indicates a pixel of the 525i signal and a small dot indicates a pixel of the 1050i signal. Further, a pixel position of odd-numbered fields is indicated by a solid line and a pixel position of even-numbered fields is indicated by a broken line. To convert the 525i signal into the 1050i signal, it is necessary to obtain four pixels of the 1050i signal each corresponding to one pixel of the 525i signal in each of odd-numbered and even-numbered fields.

For example, an image signal processing apparatus is conventionally known which utilizes class grouping adaptive processing to convert the 525i signal into the 1050i signal (see Japanese Patent Application Publication No. 2002-218413). That is, this processing apparatus generates pixel data of a target position in the 1050i signal according to an estimation equation using coefficient data that corresponds to a class to which the pixel data of this target position belongs.

For example, one piece of Large Scale Integrated (LSI) circuit may constitute the image signal processing apparatus. In this case, however, a circuit scale increases and also man-hour requirements in design also increase, to deteriorate a yield in manufacturing and increase a unit cost of the LSI.

It is an object of the present invention to provide an Integrated Circuit (IC) that can be also applied to multiple circuit portions and that has no large circuit scale so as to include multiple circuit portions, thereby allowing the IC to be manufactured stably. It is another object of the present invention to provide an information signal processing apparatus that can be configured inexpensively.

SUMMARY OF THE INVENTION

An IC related to the present invention includes one or multiple functional blocks. The one or multiple functional blocks include at least one functional block that allows its functionality to be changed by setting.

According to the present invention, by changing the functionality of at least one functional block, the functional block (s) can be applied to multiple circuit portions. Further, an IC according to the present invention has no large circuit scale so as to include multiple circuit portions and so can be manufactured stably by conventional stable processes.

For example, such a functional block may include a first functional block for selecting a part of informational data, which is multiple items of the informational data positioned in a periphery of a target position, based on an information signal comprised of multiple items of the informational data, and a second functional block for performing processing using the multiple items of the informational data selected by this first functional block. Then, for example, the first functional block changes some or all of the selected multiple items of the first informational data according to the setting, while the second functional block changes processing contents according to the setting. It is to be noted that the information signal comes in, for example, an image signal.

An information signal processing apparatus related to the present invention converts a first information signal containing multiple items of first informational data into a second information signal containing multiple items of second informational data. The information signals may come in, for example, an image signal, an audio signal, etc.

This processing apparatus comprises a first processing portion for selecting multiple items of the first informational data positioned in a periphery of a target position in the second information signal based on the first information signal and, based on the multiple items of the first informational data thus selected, detecting a class to which the second informational data of the target position in the second information signal belongs. This processing apparatus also comprises a second processing portion for selecting multiple items of the first informational data positioned in a periphery of the target position in the second information signal based on the first information signal and generating second informational data of the target position in the second information signal by performing operation(s) using the multiple items of the first informational data thus selected and coefficient data that corresponds to the class detected by the first processing portion.

The first processing portion and the second processing portion are respectively constituted of ICs having the same configuration.

For example, the ICs each have a first functional block for selecting multiple items of the first informational data positioned in a periphery of the target position based on the received first information signal, and a second functional block for performing processing using the multiple items of the first informational data thus selected. In the ICs, each of the first functional block and the second functional block changes their functionality according to setting.

If the information signal is, for example, an image signal, the first processing portion has a first class-detection processing section for selecting multiple items of the first informational data positioned in a periphery of the target position in the second information signal based on the first information signal and detecting an inter-frame difference based on the selected multiple items of the first informational data to detect a motion class that corresponds to this detected inter-frame difference and a second class-detection processing section for selecting multiple items of the first informational data positioned in a periphery of the target position in the second information signal based on the first information signal and detecting a level distribution based on the selected multiple items of the first informational data to detect a space class that corresponds to this detected level distribution. In this case, the first and second class-detection processing sections are respectively constituted of ICs having the same configuration. Such the constitution causes the processing apparatus to be configured inexpensively.

Another information signal processing apparatus related to the present invention also converts a first information signal containing multiple items of first informational data into a second information signal containing multiple items of second informational data. The information signals may come in, for example, an image signal, an audio signal, etc.

The processing apparatus comprises a first processing portion for performing filter processing on the first information signal to obtain a third information signal. The first processing portion selects multiple items of the first informational data positioned in a periphery of a target position in the third information signal based on the first information signal, and performs operation(s) using the multiple items of the first informational data thus selected and coefficient data to generate items of third informational data of the target position in the third information signal.

The processing apparatus also comprises a second processing portion for selecting multiple items of the third informational data positioned in a periphery of a target position in the second information signal based on the third information signal obtained at the first processing portion and, based on the multiple items of the third informational data thus selected, detecting a class to which the second informational data of the target position in said second information signal belongs.

The processing apparatus further comprises a third processing portion for selecting multiple items of the first informational data positioned in a periphery of the target position in said second information signal based on the first information signal and performing operation(s) using the multiple items of the first informational data thus selected and coefficient data that corresponds to the class detected at the second processing portion, to generate the second informational data of the target position in the second information signal.

In the processing apparatus, the first processing portion, the second processing portion, and the third processing portion are respectively constituted of ICs having the same configuration.

For example, the ICs each have a first functional block for selecting multiple items of the first informational data positioned in a periphery of the target position based on the received first information signal and a second functional block for performing processing using the multiple items of the first informational data thus selected. In the ICs, a functionality of each of the first functional block and the second functional block is changed according to setting.

If the information signal is, for example, an image signal, the first processing portion has a first band-limit processing section for outputting a first band-limited signal as the third information signal, and a second band-limit processing section for outputting a second band-limited signal as the third information signal.

The first band-limit processing section selects, based on the first information signal, multiple items of the first informational data positioned in a periphery of a target position in the first band-limited signal and performs a multiply-and-accumulation operation using the multiple items of the first informational data thus selected and coefficient data for adding a low-pass filter property to generate items of third informational data of the target position in the first band-limited signal.

The second band-limit processing section selects, based on the first information signal, multiple items of first informational data positioned in a periphery of a target position in the second band-limited signal and performs a multiply-and-accumulation operation using the multiple items of the first informational data thus selected and coefficient data for adding a band-pass filter property to generate items of fourth informational data of the target position in the second band-limited signal.

In this case, the second processing portion has a first class-detection processing section and a second class-detection processing section. In the first class-detection processing section, based on the first band-limited signal, the multiple items of the third informational data positioned in a periphery of the target position in the second information signal are selected. Based on the selected multiple items of the third informational data, an inter-frame difference is detected, so that a motion class that corresponds to this detected inter-frame difference is detected. In the second class-detection processing section, based on the second band-limited signal, the multiple items of the fourth informational data positioned in a periphery of the target position in the second information signal are selected. Based on the selected multiple items of fourth informational data, a level distribution is detected, so that a space class that corresponds to this detected level distribution is detected.

In this case, the first band-limit processing section, the second band-limit processing section, the first class-detection processing section, and the second class-detection processing section are respectively constituted of ICs having the same configuration. This constitution causes the processing apparatus to be configured inexpensively.

Further, based on the third information signal obtained by performing filter processing on the first information signal, a class to which the second informational data of the target position in the second information signal belongs is detected, so that it is possible to perform class grouping targeted at a predetermined frequency component. For example, a low-frequency-band component is extracted from the first information signal by low-pass filter processing and, based on this, a motion class is detected, thus enabling detecting a motion class that is robust against noise. Further, a frequency pattern component or a high-frequency-band component working as noise is extracted from the first information signal by band-pass filter processing and, based on this, a space class is detected, thus enabling detecting characteristic-amount class of the noise.

A further information signal processing apparatus related to the present invention also converts a first information signal containing multiple items of first informational data into a second information signal containing multiple items of second informational data. The information signals may come in, for example, an image signal, an audio signal, etc.

The processing apparatus comprises a first processing portion for performing noise reduction processing on the first information signal to obtain a third information signal. The first processing portion selects, based on the first information signal, multiple items of the first informational data positioned in a periphery of a target position in the third information signal and performs a multiply-and-accumulation operation using the multiple items of the first informational data thus selected and coefficient data to generate third informational data of the target position in the third information signal.

The processing apparatus also comprises a subtracter for subtracting items of informational data that constitute the third information signal generated at the first processing portion from items of the first informational data that constitute the first information signal, to obtain items of noise data that respectively correspond to the items of the first informational data that constitute the first information signal.

The processing apparatus further comprises a second processing portion for selecting multiple items of noise data positioned in a periphery of a target position in the second information signal based on the noise data obtained at the subtracter and, based on the multiple items of the noise data thus selected, detecting a class to which the second informational data of the target position in the second information signal belongs.

The processing apparatus additionally comprises a third processing portion for selecting multiple items of the first informational data positioned in a periphery of the target position in the second information signal based on the first information signal and performing a multiply-and-accumulation operation using the multiple items of the first informational data thus selected and coefficient data that corresponds to the class detected at the second processing portion, to generate the second informational data of the target position in the second information signal.

In the processing apparatus, the first processing portion, the second processing portion, and third processing portion are respectively constituted of ICs having the same configuration. This constitution causes the processing apparatus to be configured inexpensively.

Further, according to the invention, a class to which the second informational data of the target position in the second information signal belongs is detected on the basis of noise data obtained at the subtracter. The multiply-and-accumulation operation is performed using the coefficient data that corresponds to the detected class. Even if the first information signal has noise, a good information signal from which the noise is cancelled can be obtained as the second information signal. For example, if the first information signal is an image signal having block noise or mosquito noise, an image signal from which such noise is cancelled can be obtained as the second information signal.

A still further information signal processing apparatus related to the present invention converts a first information signal containing multiple signal components into a second information signal containing multiple signal components. The information signals come in, for example, an image signal, an audio signal, etc. If the information signal is, for example, an image signal, the multiple signal components include, for example, a luminosity signal, a red color-difference signal, and a blue color-difference signal or a red color signal, a green color signal, and a blue color signal or even a high-frequency-band component and a low-frequency-band component. Further, if the information signal is, for example, an audio signal, the multiple signal components include, for example, a high-frequency-band component and a low-frequency-band signal or a left-side audio signal and a right-side audio signal.

The processing apparatus comprises multiple processing portions each for selecting multiple items of the first informational data positioned in a periphery of a target position in the second information signal based on each of the multiple signal components of the first information signal and detecting classes to which the items of the second informational data of the target position in the second information signal belongs based on the multiple items of the first informational data thus selected.

The processing apparatus also comprises a class synthesis portion for synthesizing the classes detected at the multiple processing portions to generate one class.

The processing apparatus further comprises a data selection portion for selecting the multiple items of the first informational data positioned in a periphery of the target position in the second information signal based on the multiple signal components of the first information signal.

The processing apparatus additionally comprises multiple arithmetic operation portions each for performing operation(s) using the multiple items of the first informational data selected at the data selection portion and different items of coefficient data corresponding to the class generated at the class synthesis portion, to generate the second informational data of the target position in the multiple signal components of the second information signal.

In the processing apparatus, the multiple processing portions are respectively constituted of ICs having the same configuration. This constitution causes the processing apparatus to be configured inexpensively.

The concluding portion of this specification particularly points out and directly claims the subject matter of the present invention. However those skill in the art will best understand both the organization and method of operation of the invention, together with further advantages and objects thereof, by reading the remaining portions of the specification in view of the accompanying drawing(s) wherein like reference characters refer to like elements.

BRIEF DESCRIPTION OF THE DRAWINGS

FIG. 5 is an illustration for illustrating vertical phase shift in eight stages;

FIG. 10 is a block diagram for showing a configuration of an image display apparatus according to a third embodiment of this invention; and FIG. 11 is a block diagram for showing a configuration of an image signal processing apparatus according to a fourth embodiment of this invention.

DETAILED DESCRIPTION OF PREFERRED EMBODIMENTS

Figure 2:
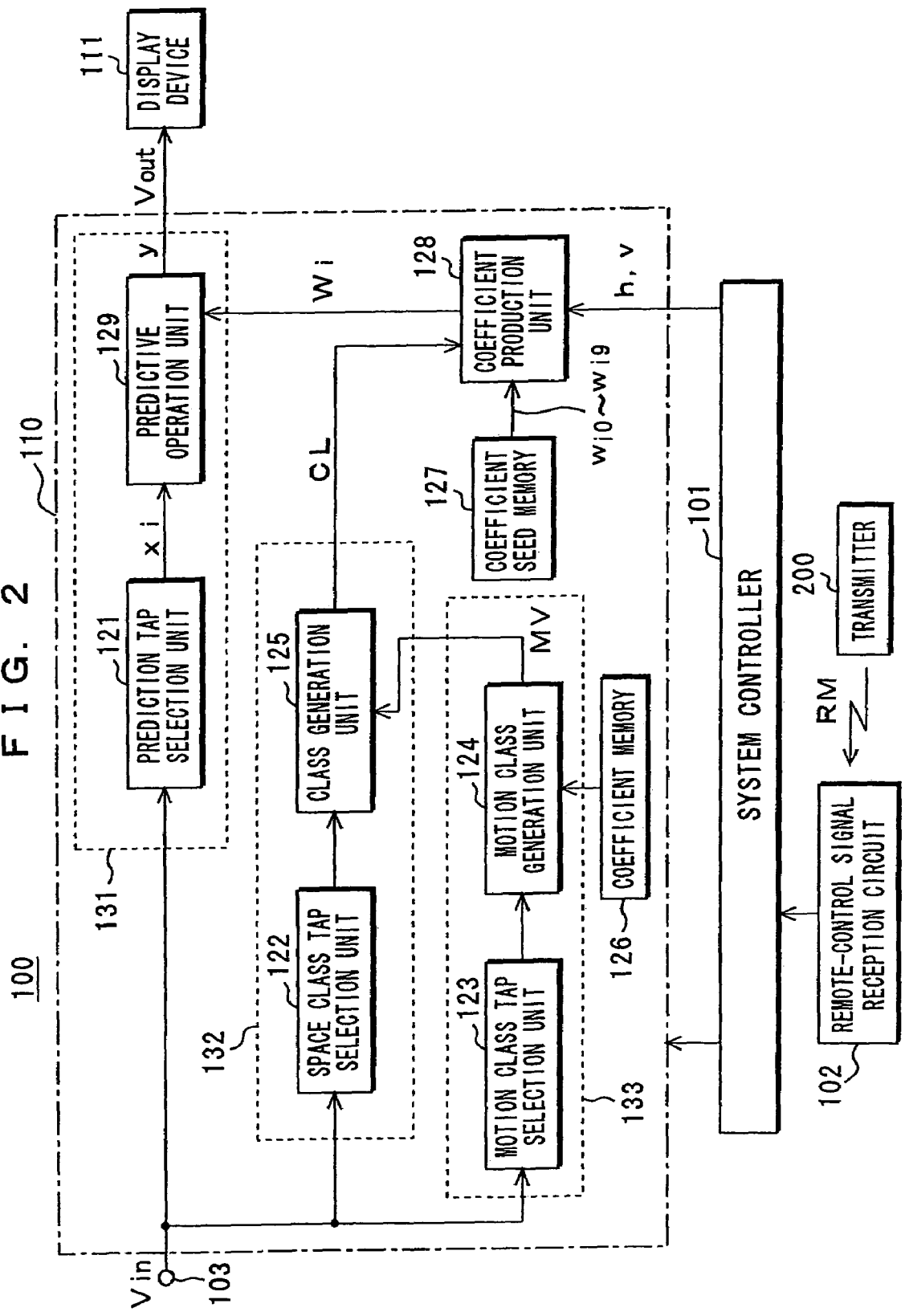
FIG. 2 is a block diagram for showing a configuration of an image display apparatus according to a first embodiment of this invention.

The following will describe a first embodiment of the present invention. FIG. 2 shows a configuration of an image display apparatus 100 according to the first embodiment of this invention. This image display apparatus 100 generates an image signal Vout (1050i signal) based on an image signal Vin (525i signal), to display an image based on this image signal Vout.

This image display apparatus 100 is provided with a microcomputer and has a system controller 101 for controlling operations of system as a whole and a remote-control signal reception circuit 102 for receiving a remote-control signal. The remote-control signal reception circuit 102 is connected to the system controller 101 and arranged to receive a remote-control signal RM from a remote-control transmitter 200 in response to a user's operations and supply an operation signal that corresponds to this signal RM to the system controller 101.

Further, the image display apparatus 100 has a receiving terminal 103 for receiving the image signal Vin, an image signal processing device 110 for generating the image signal Vout based on this image signal Vin, and a display device 111 for displaying an image based on the image signal Vout generated by this image signal processing device 110. This display device 111 comprises, for example, a Cathode Ray Tube (CRT) or a flat panel display such as a Liquid Crystal Display (LCD).

Figure 1:
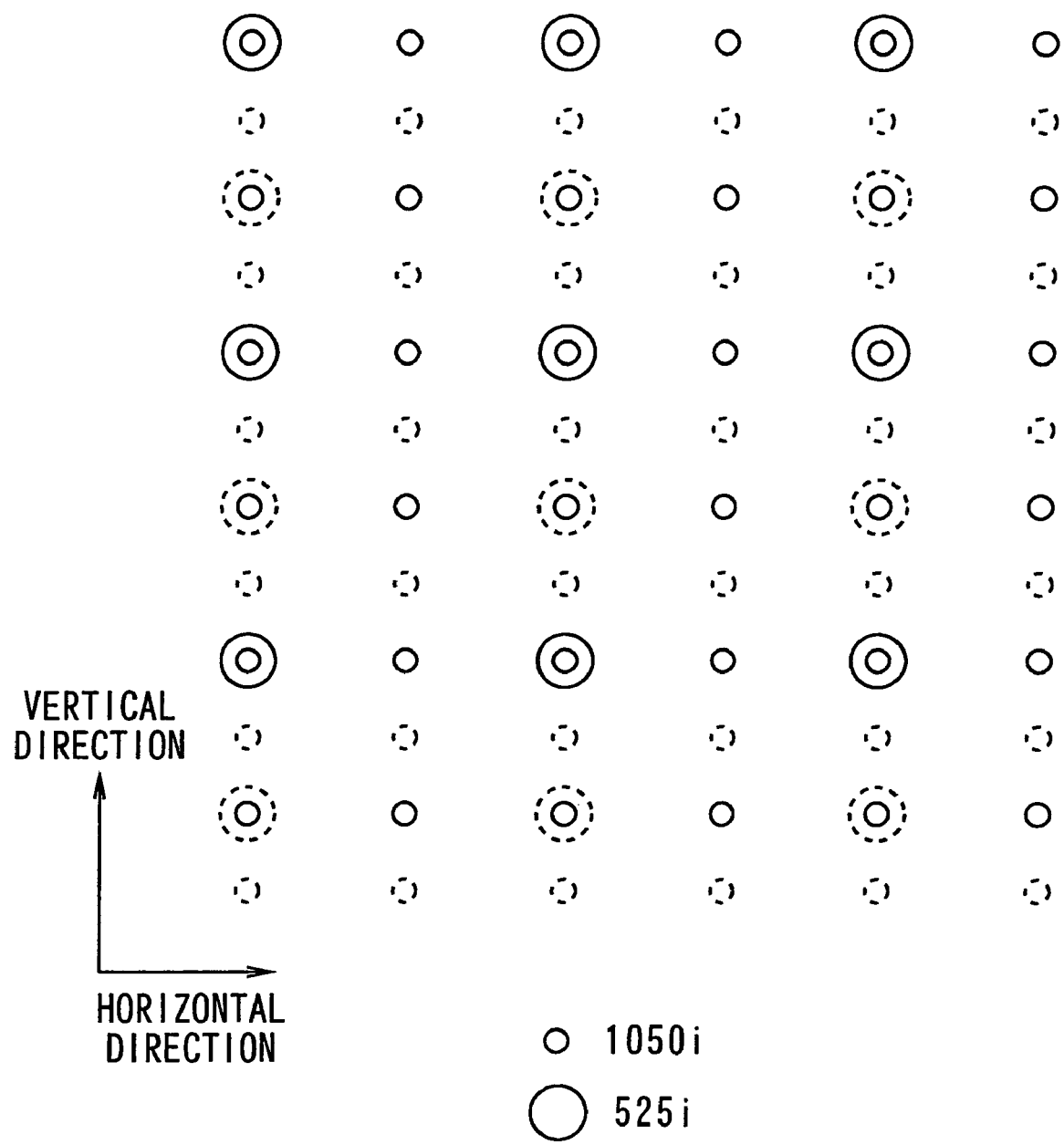
FIG. 1 is an illustration for showing a relationship in pixel position between a 525i signal (SD signal) and a 1050i signal (HD signal)

Operations of the image display apparatus 100 shown in FIG. 1 are described below.

The image signal processing device 110 receives the image signal Vin from the input terminal 103. This image signal processing device 110 generates the image signal Vout on the basis of the image signal Vin. In this case, in the image signal processing device 110, pixel data of each target position in the image signal Vout is generated sequentially.

The display device 111 receives the image signal Vout generated at this image signal processing device 110, and thus the display device 111 displays an image based on this image signal Vout on its screen.

Next, the image signal processing device 110 will be described in detail.

This image signal processing device 110 has tap selection units 121-123 for selectively extracting multiple items of pixel data positioned in a periphery of a target position in the image signal Vout based on the image signal Vin received from the input terminal 103.

The tap selection unit 121 selectively extracts data of a pixel used in prediction (hereinafter referred to as "prediction tap"). The tap selection unit 122 selectively extracts data of a pixel used in grouping of space classes (hereinafter referred to as "space class tap"). The tap selection unit 123 selectively extracts data of a pixel used in grouping of motion classes (hereinafter referred to as "motion class tap").

Further, the image signal processing device 110 has a motion class generation unit 124 for generating a motion class MV for indicating a degree of movement mainly, from data of the motion class tap (hereinafter referred to as "motion class tap data") extracted selectively at the tap selection unit 123.

This motion class generation unit 124 generates a motion class MV by, for example, the following method. That is, the motion class generation unit 124 calculates inter-frame differences from the motion class tap data extracted selectively at the tap selection unit 123. It then performs threshold value processing on an average value of absolute values of these inter-frame differences, to generate a motion class MV, which is an index of motion.

In this case, the motion class generation unit 124 calculates an average value AV of the absolute values of the inter-frame differences using following Equation (1). When the tap selection unit 123 extracts, as the motion class tap data, six items of pixel data, m1-m6, and six items of pixel data, n1-n6, which are given one frame before, Nb in Equation (1) takes on six.

$$AV = \sum_{i=1}^{Nb} |mi - ni|/Nb \quad (1)$$

The motion class generation unit 124 compares the average value AV calculated as described above with one or more threshold values, to generate the motion class MV. For example, supposing that three threshold values th1, th2, and th3 (th1<th2<th3) are prepared, if AV≦th1, MV=0; if th1<AV≦th2, MV=1; if th2<AV≦th3, MV=2; and if th3 MV=3.

Further, the image signal processing device 110 has a class generation unit 125 for detecting a space class based on a level distribution pattern of the data of space class taps extracted selectively at the tap selection unit 122 (hereinafter referred to as "space class tap"), synthesizing it with the motion class MV generated at the above-mentioned motion class generation unit 124, and generating a class CL to which pixel data of the target position in the image signal Vout belongs.

The class generation unit 125 performs operations to compress the space class tap data, for example, an 8-bit data format into a 2-bit data format utilizing, for example, Adaptive Dynamic Range Coding (ADRC), thereby generating a space class.

Supposing that a maximum value of the space class tap data is MAX, its minimum value is MIN, a dynamic range of the space class tap data is DR (MAX−MIN+1), and the number of re-quantization bits is P, a re-quantization code Qi working as a space class is obtained for space class tap data ki by performing operations of following Equation (2).

$$Qi = [(ki - \text{MIN} + 0.5) \times 2^P \div DR] \quad (2)$$

In the Equation (2), [ ] means truncation processing. If there are Na items of pixel data as the space class tap data, i=1 through Na.

Furthermore, the class generation unit 125 performs operations of a class CL using Equation (3)

$$CL = \sum_{i=1}^{Na} Qi(2^P)^{i-1} + MV \times (2^P)^{Na} \quad (3)$$

Further, the image signal processing device 110 has a coefficient seed memory 127. The coefficient seed memory 127 stores items of coefficient seed data, $w_{i0}$-$w_{i9}$ (i=1 through n) for each class. The coefficient data, $w_{i0}$-$w_{i9}$ is coefficient data in a production equation for producing coefficient data, Wi (i=1 through n) used in a predictive operation unit 129, which will be described later, in which equation pieces of phase information, h and v are used as parameters.

The predictive operation unit 129 calculates pixel data y of a target position in the image signal Vout using estimate Equation (4) from data xi of prediction taps (hereinafter referred to as "prediction tap data") and the coefficient data Wi generated at a coefficient production unit 128, which will be described later. If 10 prediction taps are selected at the tap selection unit 121, n is set to 10 in Equation (4).

$$y = \sum_{i=1}^{n} Wi \cdot xi \quad (4)$$

The coefficient data Wi in this estimate equation is generated by a production equation using the phase information, h and v as parameters as indicated by, for example, following Equation (5). The coefficient seed memory 127 stores the items of coefficient seed data, $w_{i0}$-$w_{i9}$, which are items of the coefficient data in Production equation (5), for each class. How to produce this coefficient seed data will be described later.

$$Wi = w_{i0} + w_{i1}v + w_{i2}h + w_{i3}v^2 + w_{i4}vh + w_{i5}h^2 + w_{i6}v^3 + w_{i6}v^3 + w_{i7}v^2h + w_{i8}vh^2 + w_{i9}h^3 \quad (5)$$

Further, the image signal processing device 110 has the coefficient production unit 128 for producing the coefficient data, Wi that corresponds to the target position in an image signal Vb. From the coefficient seed memory 127, this coefficient production unit 128 obtains the items of coefficient seed data, $w_{i0}$-$w_{i9}$ that correspond to a class CL generated at the class generation unit 125.

Then, this coefficient production unit 128 produces the coefficient data, Wi that corresponds to the target position based on the above-mentioned Equation (5) using the items of coefficient seed data, $w_{i0}$-$w_{i9}$ and the pieces of phase information, h and v of the target position in the image signal Vout that are supplied from the system controller 101. In this case, the pieces of phase information, h and v indicate horizontal and vertical phases respectively of this target position with respect to a pixel position of the image signal Vin as a reference.

Further, the image signal processing device 110 has the prediction operation unit 129 for obtaining the pixel data y of the target position in the image signal Vout based on the above-mentioned Equation (4) using the prediction tap data xi (i=1 through n) extracted selectively at the tap selection unit 121 and the coefficient data Wi (i=1 through n) generated at the coefficient production unit 128.

Next, operations of the image signal processing device 110 will be described.

Based on the image signal Vin input to the input terminal 103, the tap selection unit 123 selectively extracts multiple items of pixel data (motion class tap data) positioned in a periphery of the target position in the image signal Vout. This motion class tap data is supplied to the motion class generation unit 124. In this motion class generation unit 124, as the motion class tap data, a class MV indicating an index of motion is generated from each pixel data.

Further, based on the image signal Vin input to the input terminal 103, the tap selection unit 122 selectively extracts multiple items of pixel data (space class tap data) positioned in a periphery of the target position in the image signal Vout. This space class tap data is supplied to the class generation unit 125.

This class generation unit 125 performs ADRC processing on each pixel data as the space class tap data, to obtain a re-quantization code Qi as a space class (see Equation (2)). Furthermore, this class generation unit 125 synthesizes the re-quantization code Qi as this space class and the above-mentioned motion class MV, to generate a class CL (see Equation (3)). This class CL is supplied to the coefficient production unit 128.

The coefficient production unit 128 also receives the pieces of phase information, h and v of the target position in the image signal Vout from the system controller 101. The coefficient production unit 128 acquires the items of coefficient seed data, $w_{i0}$-$w_{i9}$ that correspond to the class CL, from the coefficient seed memory 127. The coefficient production unit 128 produces the coefficient data Wi that corresponds to the target position in the image signal Vout based on a production equation (see Equation (5)), using the items of coefficient seed data, $w_{i0}$-$w_{i9}$ and the pieces of phase information, h and v.

Further, based on the image signal Vin input to the input terminal 103, the tap selection unit 121 selectively extracts multiple items of pixel data (prediction tap data) positioned in a periphery of the target position in the image signal Vout. This prediction tap data xi is supplied to the predictive operation unit 129.

The prediction operation unit 129 also receives the coefficient data, Wi generated at the above-mentioned coefficient production unit 128. This predictive operation unit 129 obtains pixel data y of the target position in the image signal Vout based on the estimate equation (see Equation (4)) using the prediction tap data xi and the coefficient data Wi.

For example, the target position in the image signal Vout moves sequentially in raster scanning order, so that items of pixel data at the target positions are generated sequentially. Accordingly, the predictive operation unit 129 outputs the items of pixel data that constitute the image signal Vout sequentially in the raster scanning order.

In the above-mentioned image signal processing device 110, the tap selection unit 121 and the predictive operation unit 129 make up a processing portion 131. The tap selection unit 122 and the class generation unit 125 make up a processing portion 132. The tap selection unit 123 and the motion class generation unit 124 make up a processing portion 133. In the present embodiment, these processing portions 131-133 are respectively constituted of ICs 10 having the same configuration.

Figure 3:
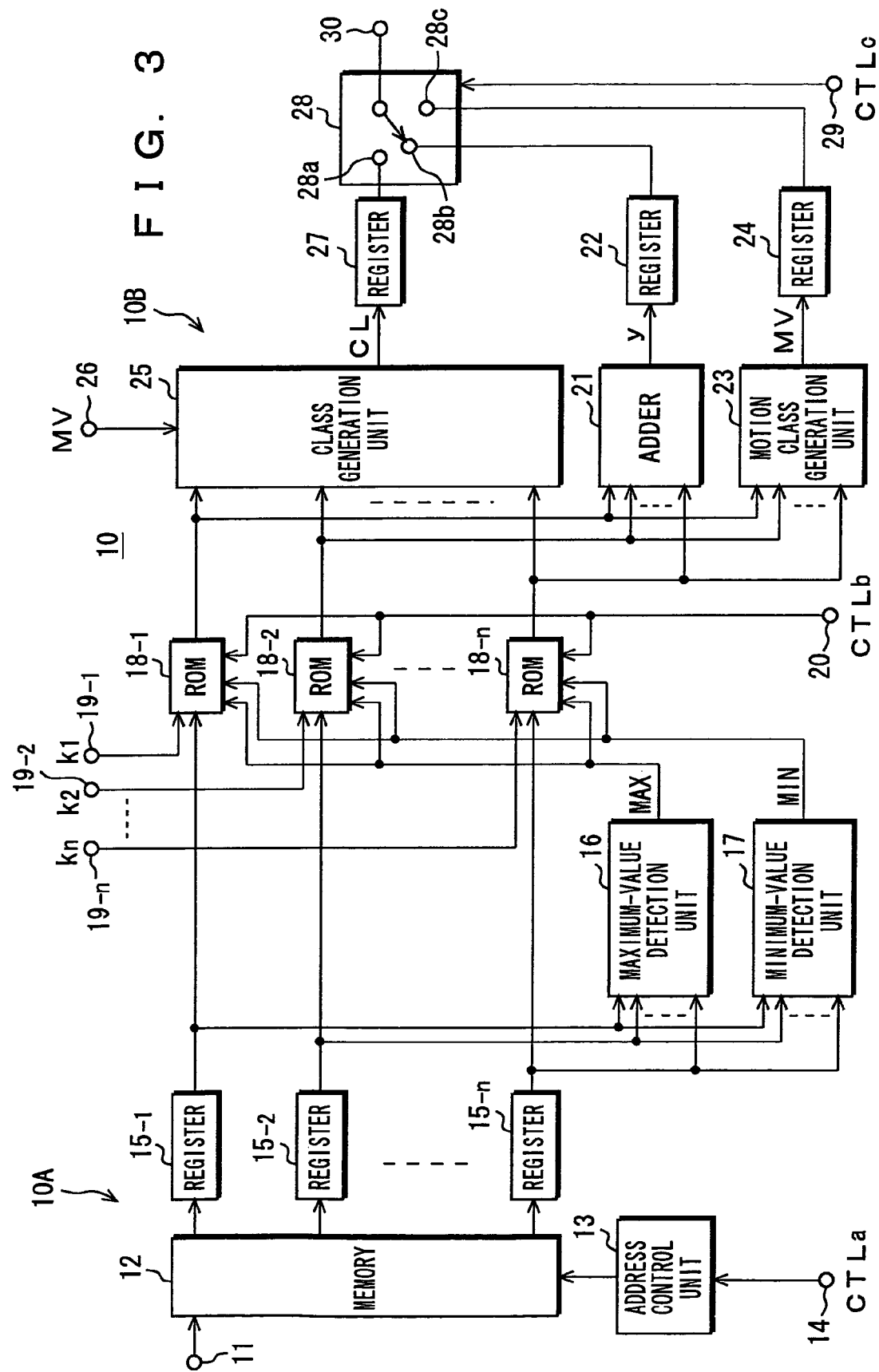
FIG. 3 is a block diagram for showing a configuration of an IC.

FIG. 3 shows a configuration example of the IC 10. This IC 10 includes a functional block 10A for selecting a part of an input image signal comprised of multiple items of pixel data, the part being multiple items of informational data positioned in a periphery of a target position, based on the pixel data. The IC 10 also includes a functional block 10B for performing processing using the multiple items of pixel data selected by this functional block 10A.

First, the functional block 10A will be described. This functional block 10A comprises a memory 12 for storing an image signal, an address control unit 13 for controlling addresses used in write and read operations to and from this memory 12, and registers $15_{-1}$-$15_{-n}$ for holding pixel data read from the memory 12. In the memory 12, an image signal is supplied via the input terminal 11 and written.

The address control unit 13 receives a control signal CTLa via an input terminal 14 from the system controller 101 (see FIG. 2). Based on this control signal CTLa, a read address for the memory 12 is controlled, so that multiple items of pixel data positioned in a periphery of a target position are read from the memory 12.

If the IC 10 constitutes the processing portion 131 in this case, multiple items of pixel data to become prediction tap data are read out of the memory 12. Further, if the IC 10 constitutes the processing portion 132, multiple items of pixel data to become space class tap data are read out of the memory 12. Furthermore, if the IC 10 constitutes the processing portion 133, multiple items of pixel data to become motion class tap data are read out of the memory 12.

The multiple items of pixel data read out of the memory 12 are held in the registers $15_{-1}$-$15_{-n}$ It is to be noted that the number of the registers $15_{-1}$-$15_{-n}$ is set to be equal to the number of prediction taps, the number of space class taps, or the number of motion class taps whichever the largest.

Next, the functional block 10B will be described. This functional block 10B comprises a maximum-value detection unit 16 for detecting a maximum value MAX of pixel data read out of the memory 12 and held in the registers $15_{-1}$-$15_{-n}$, a minimum-value detection unit 17 for detecting a minimum value MIN of the pixel data similarly held in the registers $15_{-1}$-$15_{-n}$, and ROM tables $18_{-1}$-$18_{-n}$.

The ROM tables $18_{-1}$-$18_{-n}$ receive the items of pixel data held in the registers $15_{-1}$-$15_{-n}$ respectively, as address data. Further, the ROM tables $18_{-1}$-$18_{-n}$ receive items of coefficient data $k_1$-$k_n$ via input terminals $19_{-1}$-$19_{-n}$ respectively, as address data. Furthermore, the ROM tables $18_{-1}$-$18_{-n}$ commonly receive the maximum value MAX detected at the maximum-value detection unit 16 and the minimum value MIN detected at the minimum-value detection unit 17, as address data.

The ROM tables $18_{-1}$-$18_{-n}$ receive a control signal CTLb from the system controller 101 (see FIG. 2) via an input terminal 20. Based on the control signal CTLb, the ROM tables $18_{-1}$-$18_{-n}$ switches between output of the data corresponding to the pixel data and the coefficient data and output of the data corresponding to the pixel data and the maximum and minimum values MAX and MIN.

If, in this configuration, the IC 10 constitutes the processing portion 131, the ROM tables $18_{-1}$-$18_{-n}$ are switched so as to provide output data that corresponds to the pixel data and the coefficient data. In this case, to the input terminals $19_{-1}$-$19_{-n}$, the coefficient data Wi generated at the coefficient production unit 128 is input as items of coefficient data, $k_1$-$k_n$, and thus, the ROM tables $18_{-1}$-$18_{-n}$ obtain Wi·xi as their output data (see Equation (4)).

Further, if the IC 10 constitutes the processing portion 133, the ROM tables $18_{-1}$-$18_{-n}$ are switched so as to provide output data that corresponds to the pixel data and the coefficient data. In this case, to the input terminals $19_{-1}$-$19_{-n}$, the coefficient data (1 and −1) read out of the coefficient memory 126 (see FIG. 2) is input as items of the coefficient data, $k_1$-$k_n$, and thus, the ROM tables $18_{-1}$-$18_{-n}$ obtain mi and −ni as their output data (see Equation (1)).

Furthermore, if the IC 10 constitutes the processing portion 132, the ROM tables $18_{-1}$-$18_{-n}$ are switched so as to provide output data that corresponds to the pixel data, the maximum value MAX, and the minimum value MIN. In this case, the ROM tables $18_{-1}$-$18_{-n}$ obtains a re-quantization code Qi as their output data (see Equation (2)).

The functional block 10B comprises an adder 21 for adding up the items of output data of the ROM tables $18_{-1}$-$18_{-n}$ to obtain pixel data y of the target position and a register 22 for holding the pixel data y obtained at this adder 21.

The functional block 10B comprises a motion class generation unit 23 for generating a motion class MV based on the items of output data of the ROM tables $18_{-1}$-$18_{-n}$ and a register 24 for holding the motion class MV generated at this motion class generation unit 23.

The functional block 10B comprises a class generation unit 25 for generating a class CL based on the items of output data of the ROM tables $18_{-1}$-$18_{-n}$ and a register 27 for holding the class CL generated at this class generation unit 25. The class generation unit 25 receives a motion class MV via an input terminal 26.

The functional block 10B comprises a transfer switch 28 for selectively extracting the data held in the registers 22, 24, and 27. A class CL held in the register 27 is supplied to a fixed terminal 28a of the transfer switch 28. The pixel data y held in the register 22 is supplied to a fixed terminal 28b thereof. The motion class MV held in the register 24 is supplied to a fixed terminal 28c thereof.

This transfer switch 28 receives a control signal CTLc from the system controller 101 via an input terminal 29 (see FIG. 3). The transfer switch 28 is controlled in transfer based on this control signal CTLc. Data extracted through this transfer switch 28 is transferred to an output terminal 30.

If, in this configuration, the IC 10 constitutes the processing portion 131, the transfer switch 28 is connected to the fixed terminal 28b. In this case, as described above, Wi·xi is obtained as items of output data of the ROM tables $18_{-1}$-$18_{-n}$, so that pixel data y of a target position is well obtained from the adder 21 (see Equation (4)), which pixel data y is transferred via the fixed terminal 28b of the transfer switch 28 to the output terminal 30.

If the IC 10 constitutes the processing portion 133, the transfer switch 28 is connected to the fixed terminal 28c. In this case, as described above, mi and −ni are obtained as items of output data of the ROM tables $18_{-1}$-$18_{-n}$, so that a motion class MV is well generated at the motion class generation unit 23, which motion class MV is transferred to the output terminal 30 via the register 24 and the fixed terminal 28c of the transfer switch 28.

If the IC 10 constitutes the processing portion 132, the transfer switch 28 is connected to the fixed terminal 28a. In this case, as described above, re-quantization data Qi is obtained as items of output data of the ROM tables $18_{-1}$-$18_{-n}$, so that a class CL is well generated at the class generation unit 25, which class CL is transferred to the output terminal 30 via the register 27 and the fixed terminal 28a of the transfer switch 28.

Thus, in the image signal processing device 110 according to the present embodiment, the processing portions 131-133 are respectively constituted of the ICs 10 having the same configuration. This allows the image signal processing device to be configured inexpensively.

Further, the IC 10 includes the functional blocks 10A and 10B, each of which is changed in functionality according to setting. That is, in the functional block 10A, at least a part of the multiple items of selected pixel data are changed based on the control signal CTLa. In the functional block 10B, processing contents are changed based on the control signals CTLb and CTLc. Therefore, this IC 10 can be applied to any of the processing portions 131-133 and, it is not of large scaled circuit as to include all of the processing portions 131-133 and so can be manufactured stably and inexpensively at a high yield.

Next, items of coefficient seed data, $w_{i0}$-$w_{i9}$ (i=1 through n) to be stored in the coefficient seed memory 127 beforehand will be described.

Learning has produced the items of coefficient seed data, $w_{i0}$-$w_{i9}$. First, how to produce them will be described. An example for obtaining the items of coefficient seed data, $w_{i0}$-$w_{i9}$, which are items of the coefficient data in Production equation (5), is given.

For the following description, ti (i=0 through 9) is defined as indicated in Equation (6).

$$t_0=1, t_1=v, t_2=h, t_3=v^2, t_4=vh, t_5=h^2, t_6=v^3, t_7=v^2h, t_8=vh^2, t_9=h^3 \qquad (6)$$

Using Equation (6), Equation (5) can be written as following Equation (7):

$$W_i = \sum_{j=0}^{9} w_{ij} t_j \qquad (7)$$

Finally, an undetermined coefficient $w_{ij}$ is obtained by the learning. That is, for each class, a coefficient value that minimizes a square error is determined using pixel data of a student signal and pixel data of a teacher signal. This is a solution by means of a so-called least-squares method. Supposing that the number of learnings is m, a residual in the k'th ($1 \leq k \leq m$) item of learning data is $e_k$, and a total sum of square errors is E, E is given in following Equation (8) using Equations (4) and (5).

$$E = \sum_{k=1}^{m} e_k^2 \qquad (8)$$

$$= \sum_{k=1}^{m} [y_k - (W_1 \times 1k + W_2 \times 2k + \ldots + W_n \times nk)]^2$$

$$= \sum_{k=1}^{m} \{y_k - [(t_0 w_{10} + t_1 w_{11} + \ldots + t_9 w_{19}) \times 1k + \ldots + (t_0 w_{n0} + t_1 w_{n1} + \ldots + t_9 w_{n9}) \times nk]\}^2$$

$$= \sum_{k=1}^{m} \{y_k - [(w_{10} + w_{11}v + \ldots + w_{19}h^3) \times 1k + \ldots + (w_{n0} + w_{n1}v + \ldots + w_{n9}h^3) \times nk]\}^2$$

In this equation, $x_{ik}$ indicates the k'th item of pixel data at the i'th prediction tap in a student image and $y_k$ indicates the corresponding k'th item of pixel data of a teacher image.

According to a solution by means of the least-squares method, such a value of $w_{ij}$ that a partial differential due to $w_{ij}$ in Equation (8) may be 0 is obtained. This is indicated by Equation (9).

$$\partial E / \partial w_{ij} = \sum_{k=1}^{m} 2(\partial e_k / \partial w_{ij}) e_k \qquad (9)$$

$$= -\sum_{k=1}^{m} 2 t_j x_{ik} e_k$$

$$= 0$$

Assuming $X_{i,p,j,q}$ and $Y_{i,p}$ are defined as indicated in following Equations (10) and (11), Equation (9) is rewritten as Equation (12) using a matrix.

$$X_{i,p,j,q} = \sum_{k=1}^{m} x_{ik} t_p x_{jk} t_q \qquad (10)$$

$$Y_{i,p} = \sum_{k=1}^{m} x_{ik} t_p Y_k \qquad (11)$$

$$\begin{bmatrix} x_{1010} & x_{1011} & x_{1012} & \cdots & x_{1019} & x_{1020} & \cdots & x_{10n9} \\ x_{1110} & x_{1111} & x_{1112} & \cdots & x_{1119} & x_{1120} & \cdots & x_{11n9} \\ x_{1210} & x_{1211} & x_{1212} & \cdots & x_{1219} & x_{1220} & \cdots & x_{12n9} \\ \vdots & \vdots & \vdots & \ddots & \vdots & \vdots & \ddots & \vdots \\ x_{1910} & x_{1911} & x_{1912} & \cdots & x_{1919} & x_{1920} & \cdots & x_{19n9} \\ x_{2010} & x_{2011} & x_{2012} & \cdots & x_{2019} & x_{2020} & \cdots & x_{20n9} \\ \vdots & \vdots & \vdots & \ddots & \vdots & \vdots & \ddots & \vdots \\ x_{n910} & x_{n911} & x_{n912} & \cdots & x_{n919} & x_{n920} & \cdots & x_{n9n9} \end{bmatrix} \qquad (12)$$

$$\begin{bmatrix} w_{10} \\ w_{11} \\ w_{12} \\ \vdots \\ w_{19} \\ w_{20} \\ \vdots \\ w_{n9} \end{bmatrix} = \begin{bmatrix} Y_{10} \\ Y_{11} \\ Y_{12} \\ \vdots \\ Y_{19} \\ Y_{20} \\ \vdots \\ Y_{n9} \end{bmatrix}$$

This equation is generally referred to as a normal equation. This normal equation is solved using a sweeping out method (Gauss-Jordan's elimination method) etc. in terms of $w_{ij}$, thus calculating the coefficient seed data.

Figure 4:
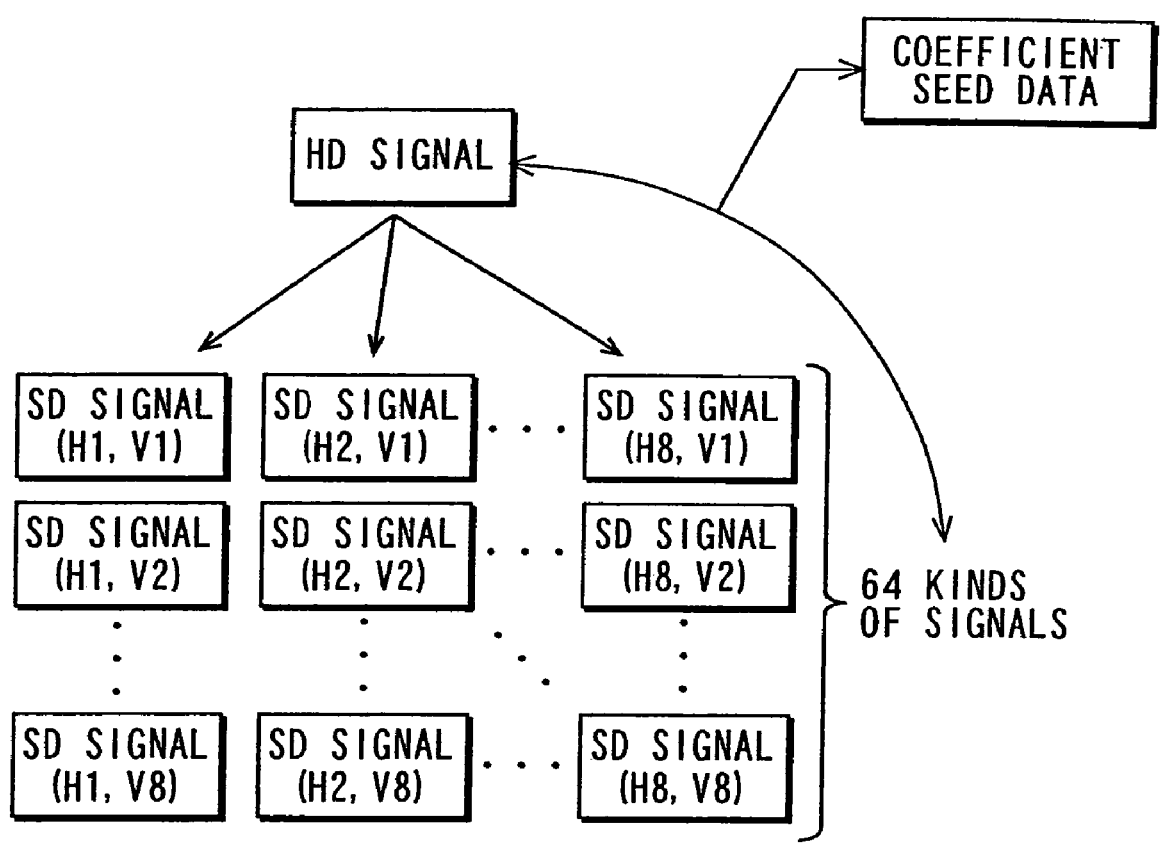
FIG. 4 is an illustration for showing one example of a method for generating coefficient seed data.

FIG. 4 shows a concept of a method for producing the above-mentioned coefficient seed data. From the HD signal (1050i signal) as a teacher signal, the SD signal (525i signal) as a student signal is generated. A relationship in pixel position between the 525i signal and the 1050i signal is shown in the above-mentioned FIG. 1.

By shifting a phase of this SD signal in eight stages vertically and horizontally, 64 (=8×8) kinds of SD signals, $SD_1$ through $SD_{64}$ are generated. FIG. 5 shows vertical phase-shift states, V1 through V8 in eight stages. In this case, a vertical inter-pixel spacing of the SD signal is 16, with its positive shifting direction supposed to be downward. Further, "o" represents an odd-numbered field and "e" represents an even-numbered field.

In the V1 state, a shift amount of the SD signal is supposed to be 0, in which pixels of the HD signal have phases of 4, 0, −4, and −8 with respect to each of the pixels of the SD signal.

In the V2 state, the shift amount of the SD signal is supposed to be 1, in which the pixels of the HD signal have phases of 7, 3, −1, and −5 with respect to each the pixels of the SD signal.

In the V3 state, the shift amount of the SD signal is supposed to be 2, in which the pixels of the HD signal have phases of 6, 2, −2, and −6 with respect to each of the pixels of the SD signal.

In the V4 state, the shift amount of the SD signal is supposed to be 3, in which the pixels of the HD signal have phases 5, 1, −3, and −7 with respect to each of the pixels of the SD signal.

In the V5 state, the shift amount of the SD signal is supposed to be 4, in which the pixels of the HD signal have phases 4, 0, −4, and −8 with respect to each of the pixels of the SD signal.

In the V6 state, the shift amount of the SD signal is supposed to be 5, in which the pixels of the HD signal have phases 7, 3, −1, and −5 with respect to each of the pixels of the SD signal.

In the V7 state, the shift amount of the SD signal is supposed to be 6, in which the pixels of the HD signal have phases 6, 2, −2, and −6 with respect to each of the pixels of the SD signal.

In the V8 state, the shift amount of the SD signal is supposed to be 7, in which the pixels of the HD signal have phases 5, 1, −3, and −7 with respect to each of the pixels of the SD signal.

Figure 6:
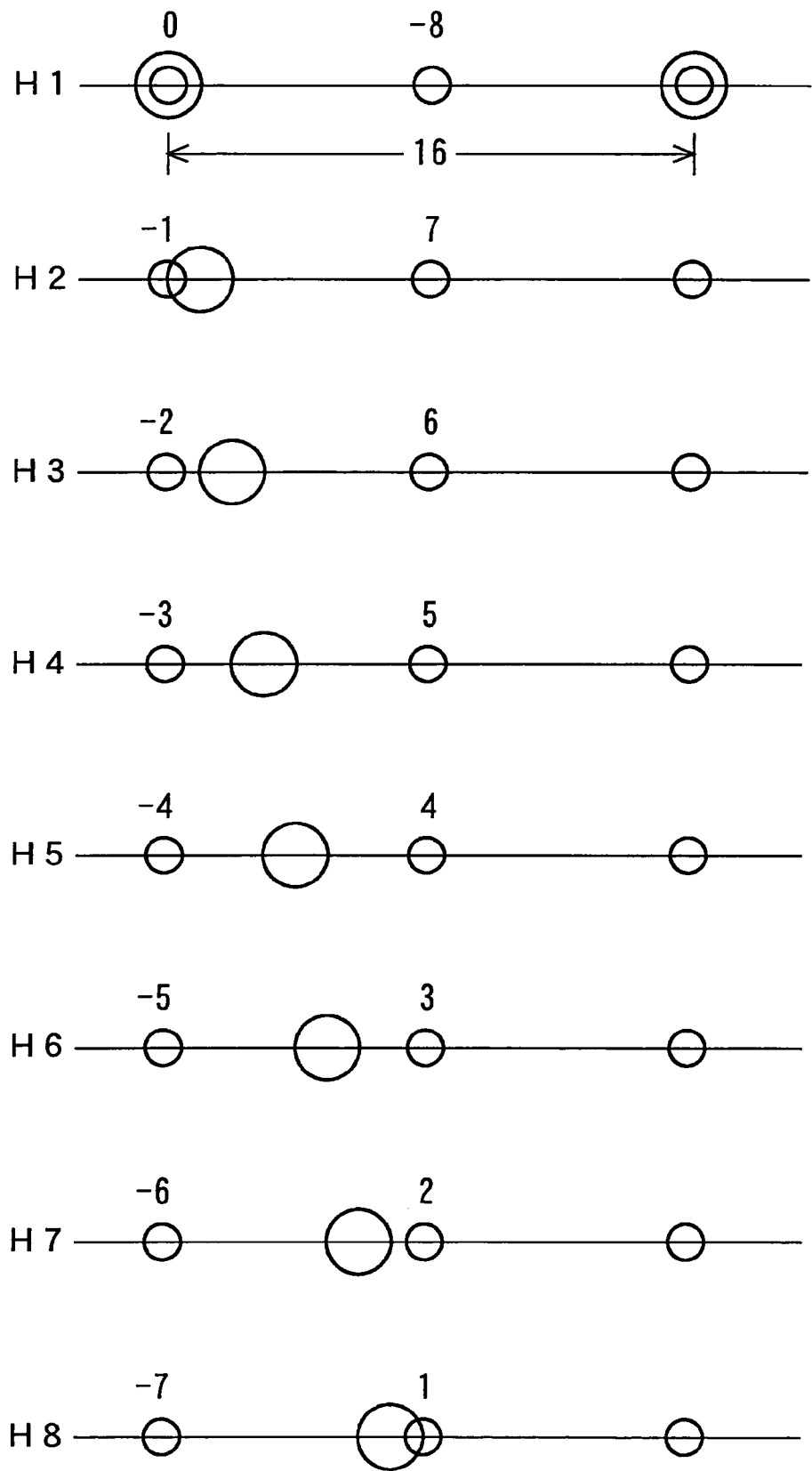
FIG. 6 is an illustration for illustrating horizontal phase shift in eight stages.

FIG. 6 shows horizontal phase shift states H1-H8 in eight stages. In this case, a horizontal inter-pixel spacing of the SD signal is 16, with its positive shifting direction supposed to be rightward.

In the H1 state, the shift amount of the SD signal is supposed to be 0, in which the pixels of the HD signal have phases 0 and −8 with respect to each of the pixels of the SD signal.

In the H2 state, the shift amount of the SD signal is supposed to be 1, in which the pixels of the HD signal have phases 7 and −1 with respect to each of the pixels of the SD signal.

In the H3 state, the shift amount of the SD signal is supposed to be 2, in which the pixels of the HD signal have phases 6 and −2 with respect to each of the pixels of the SD signal.

In the H4 state, the shift amount of the SD signal is supposed to be 3, in which the pixels of the HD signal have phases 5 and −3 with respect to each of the pixels of the SD signal.

In the H5 state, the shift amount of the SD signal is supposed to be 4, in which the pixels of the HD signal have phases 4 and −4 with respect to each of the pixels of the SD signal.

In the H6 state, the shift amount of the SD signal is supposed to be 5, in which the pixels of the HD signal have phases 3 and −5 with respect to each of the pixels of the SD signal.

In the H7 state, the shift amount of the SD signal is supposed to be 6, in which the pixels of the HD signal have phases 2 and −6 with respect to each of the pixels of the SD signal.

In the H8 state, the shift amount of the SD signal is supposed to be 7, in which the pixels of the HD signal have phases 1 and −7 with respect to each of the pixels of the SD signal.

Figure 7:
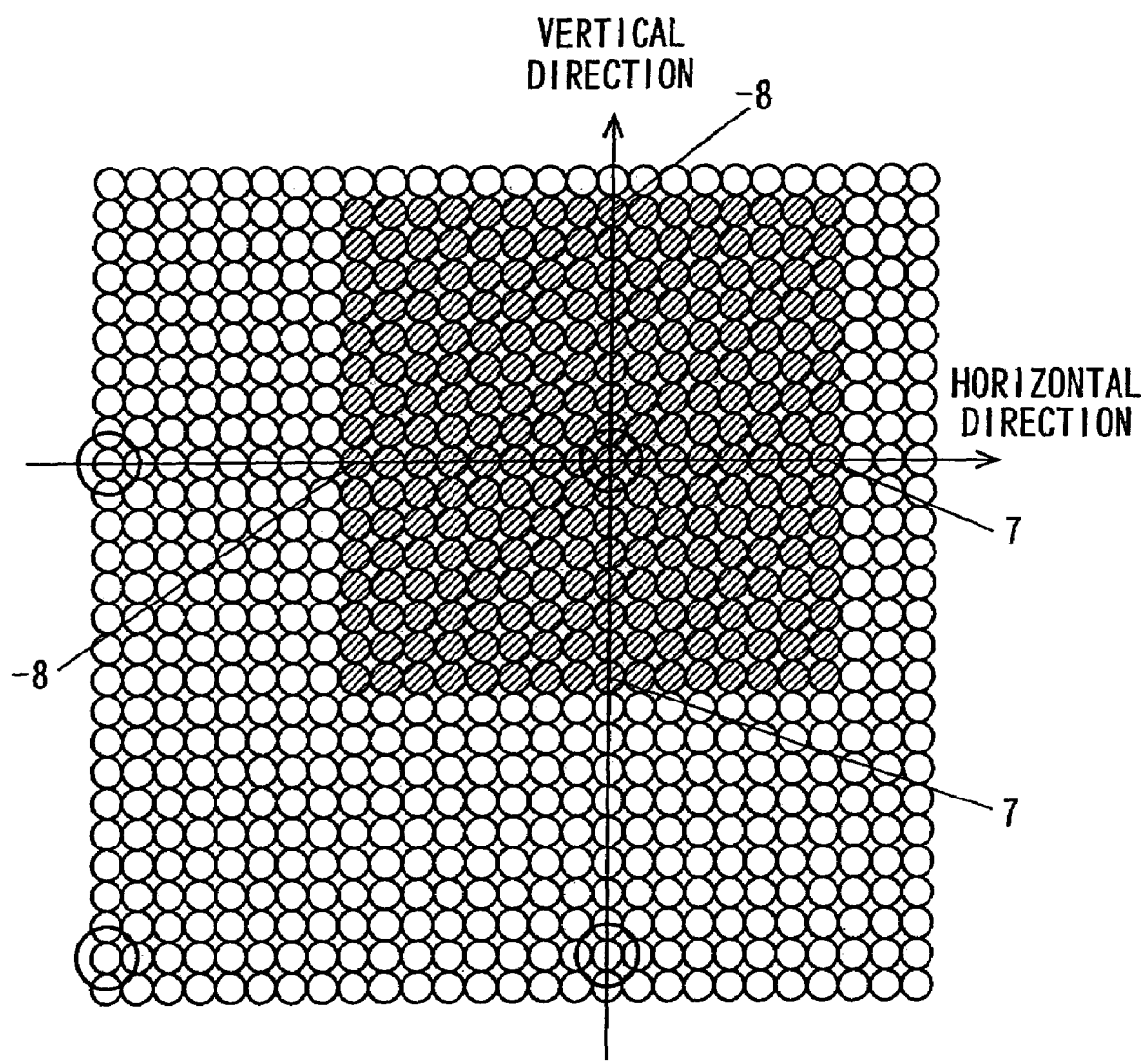
FIG. 7 is an illustration for showing a relationship in pixel position between the SD signal (525i signal) and the HD signal (1050i signal)

FIG. 7 shows phases of the HD signal in a case where a pixel of SD signal is indicated as a center, with reference to the 64 kinds of SD signals obtained by shifting the SD signal in eight stages vertically and horizontally, as described above. That is, with respect to the pixel of the SD signal, the pixels of the HD signal shaded diagonally in FIG. 7 have various phases. In this case, a method for extracting only a desired phase through an over-sampling filter is described as an example of a phase shifting method.

By performing learning between the HD signal and each of the 64 kinds of SD signals obtained by shifting the SD signal in eight stages vertically and horizontally as described above, the items of coefficient seed data, $w_{i0}$-$w_{i9}$ (i=1 through n) are produced.

Figure 8:
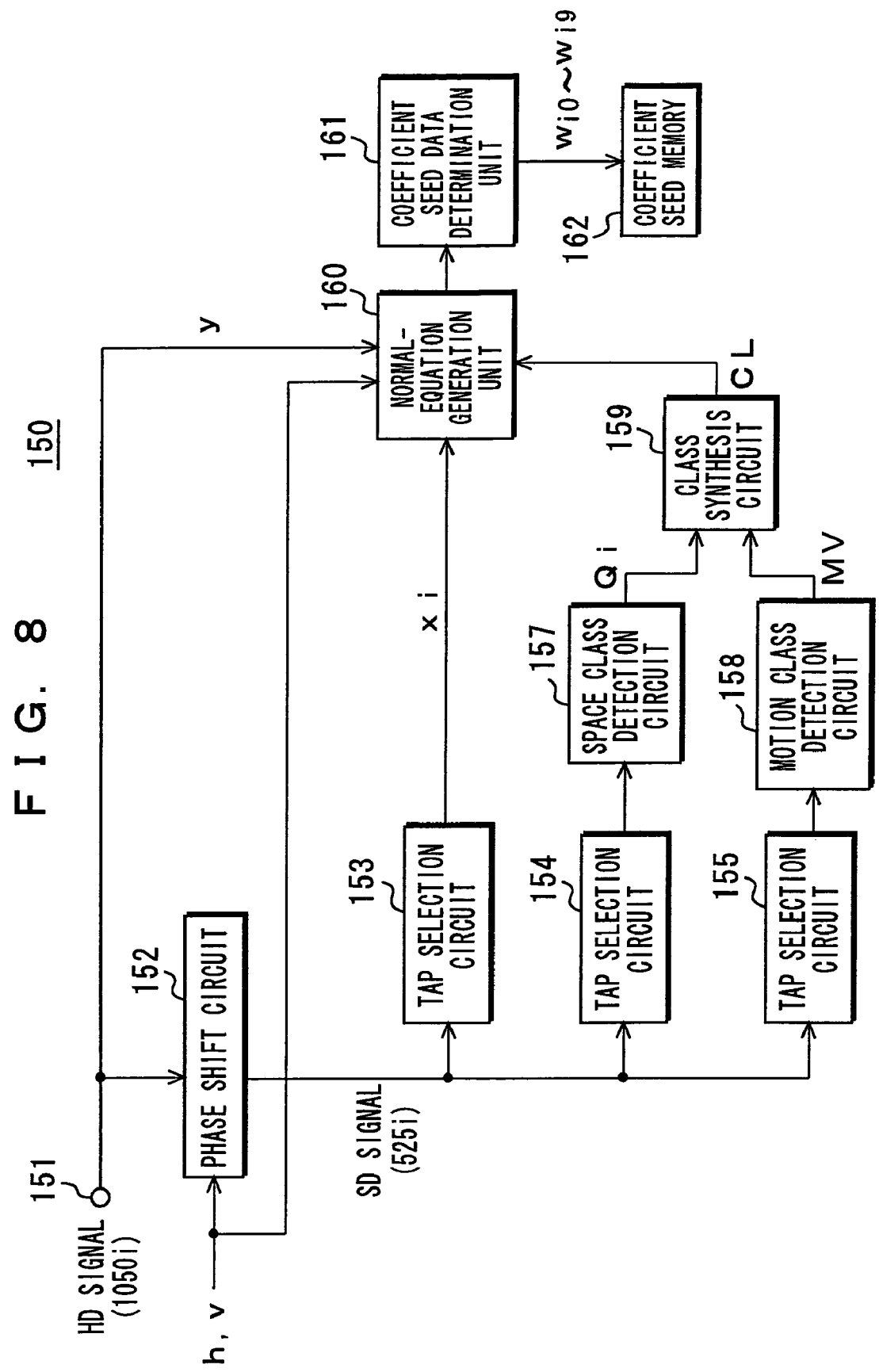
FIG. 8 is a block diagram for showing a configuration of a coefficient-seed-data-generating apparatus.

FIG. 8 shows a configuration a coefficient seed data production device 150 for producing the coefficient seed data using the above-mentioned concept.

This coefficient seed data production device 150 has an input terminal 151 for receiving the HD signal (1050i) as a teacher signal and a phase shift circuit 152 for performing over-sampling filtering on this HD signal horizontally and vertically to extract a desired phase, thereby obtaining an SD signal. This phase shift circuit 152 receives parameters, h and v that specify a horizontal phase shift amount and a vertical phase shift amount, respectively. In this case, the parameters, h and v correspond to pieces of phase information, h and v in the image signal processing device 110 in FIG. 2.

Further, the coefficient seed data production device 150 has tap selection circuits 153-155 for selecting multiple items of SD pixel data positioned in a periphery of a target position in the HD signal, based on the SD signal received from the phase shift circuit 152. The tap selection circuits 153-155 have the configuration similar to those of the tap selection units 121-123 of the image signal processing device 110 described above.

The coefficient seed data production device 150 has a space class detection circuit 157, a motion class detection circuit 158, and a class synthesis circuit 159. These circuits have functions similar to those of the motion class generation unit 124 and the class generation unit 125 in the image signal processing device 110 described above. The space class detection circuit 157 and the motion class detection circuit 158 receive, as an input, tap data (pixel data) extracted from the tap selection circuits 154 and 155, respectively.

The coefficient seed data production device 150 has a normal-equation generation unit 160 for receiving each item of HD pixel data y as the pixel data of a target position in the HD signal input to the input terminal 151, prediction tap data xi extracted selectively at the tap selection circuit 153 corresponding to each item of the HD pixel data y, a class CL from the class synthesis circuit 159 corresponding to each item of the HD pixel data y, and the parameters h and v which specify horizontal and vertical phase shift amounts, respectively. Thus, the normal-equation generation unit 160 generates a normal equation (see Equation (12)) for obtaining, for each class, the items of coefficient seed data, $w_{i0}$-$w_{i9}$ (i=1 through n) from the received ones.

In this case, learning data is generated by combination of one item of the HD pixel data y and n items of the prediction tap pixel data corresponding thereto. With the parameters, h and v applied to the phase shift circuit 152 being changed sequentially, the corresponding SD signals are generated sequentially, thereby permitting the normal equation generating unit 160 to generate a normal equation in which many items of learning data are registered.

In such a manner, the normal-equation generation unit 160 generates a normal equation in which many items of learning data are registered with the 64 kinds of SD signals $SD_1$-$SD_{64}$ which have horizontal and vertical phase shift amounts changed in stages being generated sequentially. Thus generating the SD signals $SD_1$-$SD_{64}$ to register learning data therein allows the coefficient seed data required for obtaining pixel data of an arbitrary phase to be acquired.

Further, the coefficient seed data production device 150 has a coefficient seed data determination unit 161 and a coefficient seed memory 162. The coefficient seed data determination unit 161 receives data of a normal equation generated for each class at the normal-equation generation unit 160, and solves the normal equation for each class to obtain coefficient seed data, $w_{i0}$-$w_{i9}$ of each class. The coefficient seed memory 162 stores the items of coefficient seed data, $w_{i0}$-$w_{i9}$ thus obtained.

Operations of the coefficient seed data production device 150 shown in FIG. 8 will be described.

To the input terminal 151, the HD signal (1050i signal) as a teacher signal is input. On this HD signal, the phase shift circuit 152 performs horizontal and vertical over-sampling filtering to extract a desired phase, thereby obtaining SD signals. In this case, the SD signals, which are shifted in eight vertical and horizontal stages, respectively, are generated sequentially.

From the SD signals output from the phase shift circuit 152, the tap selection circuit 154 selectively extracts space class tap data (SD pixel data) positioned in a periphery of a target position in the HD signal. The space class tap data (SD pixel data) is supplied to the space class detection circuit 157. This space class detection circuit 157 performs ADRC processing on each item of SD pixel data as the space class tap data, to obtain a re-quantization code Qi (see Equation (2)).

Further, from these SD signals output from the phase shift circuit 152, the tap selection circuit 155 selectively extracts motion class tap data (SD pixel data) positioned in the periphery of the target position in the HD signal. This motion class tap data (SD pixel data) is supplied to the motion class detection circuit 158. This motion class detection circuit 158 obtains a motion class MV from each item of SD pixel data as the motion class tap data.

The class synthesis circuit 159 receives the motion class MV and the above-mentioned re-quantization code Qi. The class synthesis circuit 159 obtains a class CL to which pixel data of the target position in the HD signal belongs from the motion class MV and the re-quantization code Qi (see Equation (3)).

From the SD signals output from the phase shift circuit 152, the tap selection circuit 153 selectively extracts prediction tap data (SD pixel data) positioned in a periphery of a target position in the HD signal.

Then, from each item of the HD pixel data y as pixel data of the target position in the HD signal input to the input terminal 151, the prediction tap data (SD pixel data) xi extracted selectively at the tap selection circuit 153 corresponding to each item of the HD pixel data, respectively, the class CL output from the class synthesis circuit 159 corresponding to each item of the HD pixel data y, respectively, and the parameters, h and v, the normal-equation generation unit 160 produces the normal equation for obtaining the coefficient seed data, $w_{i0}$-$w_{i9}$ (i=1 through n) for each class.

Then, the coefficient seed data determination unit 161 solves this normal equation to obtain the coefficient seed data, $w_{i0}$-$w_{i9}$ of each class. The coefficient seed data, $w_{i0}$-$w_{i9}$ is stored in the coefficient seed memory 162, in which addresses are divided for each class.

In such a manner, at the coefficient seed data production device 150 shown in FIG. 8, it is possible to produce the coefficient seed data, $w_{i0}$-$w_{i9}$ of each class, which are to be stored in the coefficient seed memory 127 of the image signal processing device 110 of FIG. 1.

It is to be noted that the coefficient seed data production device 150 shown in FIG. 8 sequentially changes the parameters, h and v, which specify phase shift amounts in the horizontal and vertical directions respectively, to produce a normal equation in which many items of the learning data are registered, thereby obtaining the coefficient seed data, $w_{i0}$-$w_{i9}$ of each class at a time.

By another method for obtaining the coefficient seed data, $w_{i0}$-$w_{i9}$, first, learning is performed for each of the SD signals generated by combinations of the parameters, h and v, to individually obtain the coefficient data Wi that corresponds to each of the combinations of the parameters, h and v. Then, the coefficient data Wi thus obtained individually is employed as teacher data, and thus the coefficient seed data, $w_{i0}$-$w_{i9}$ may be obtained so that it may satisfy a relationship of Equation (5) according to the least-squares method using Equation (6) as a variable.

Figure 9:
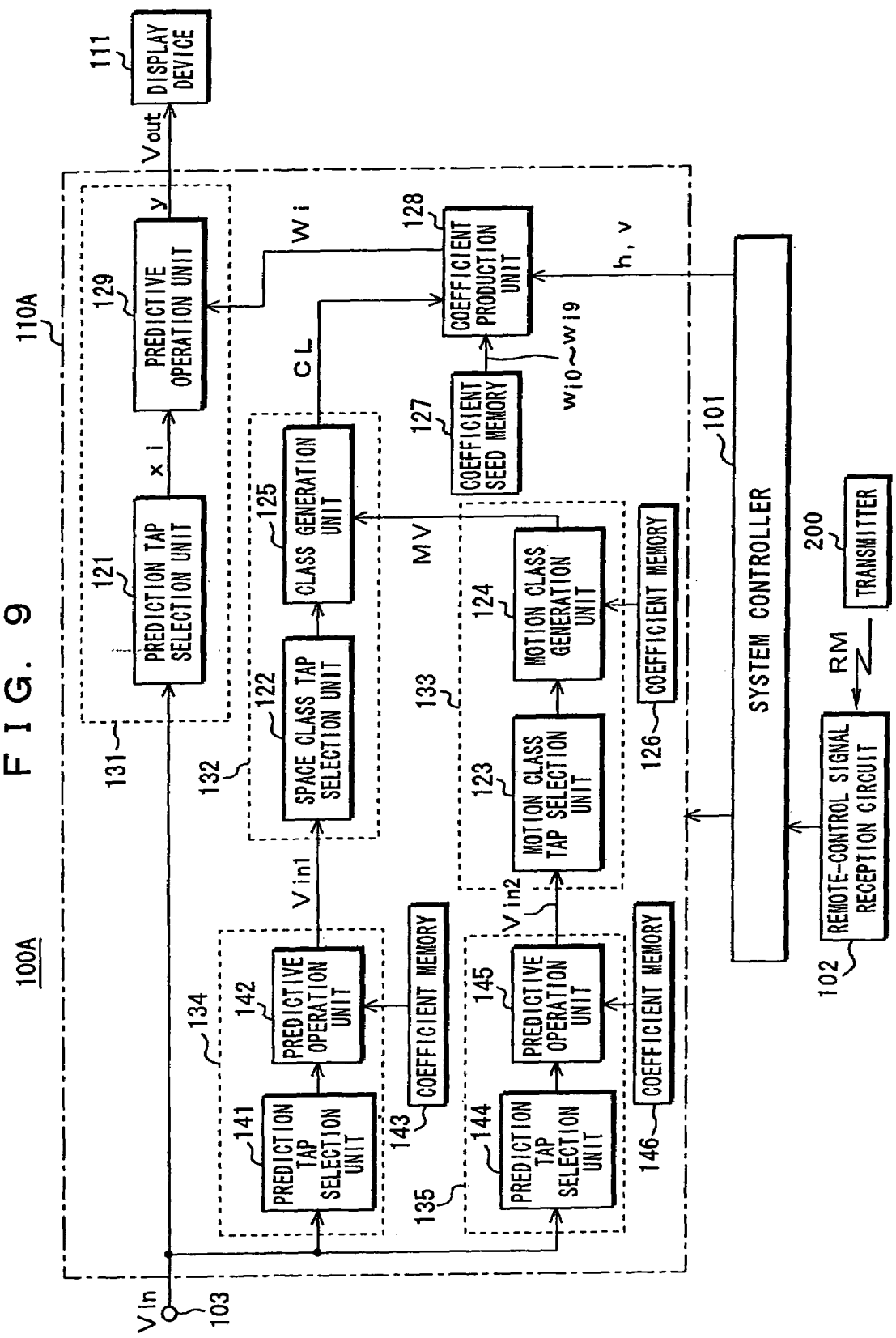
FIG. 9 is a block diagram for showing an image display apparatus according to a second embodiment of this invention.

The following will describe a second embodiment according to the present invention. FIG. 9 shows an image display apparatus 100A according to the second embodiment. This image display apparatus 100A also generates an image signal Vout (1050i signal) based on an image signal Vin (525i signal), to display an image based on this image signal Vout. In this FIG. 9, components corresponding to those in FIG. 2 are indicated by the same numbers and their detailed description is omitted.

This image display apparatus 100A has substituted an image signal processing device 110A for the image signal processing device 110 of the image display apparatus 100 shown in FIG. 2. Thus, only this image signal processing device 110A will be described.

This image signal processing device 110A has a processing portion 134 at a stage on an upstream side of a processing portion 132 and a processing portion 135 at a stage on an upstream side of a processing portion 133. These processing portions 134 and 135 are used to perform filter processing on the image signal Vin, thereby obtaining image signals Vin1 and Vin2, respectively.

In the present embodiment, low-pass filter processing is performed at the processing portion 135, so that a low-frequency-band component is extracted from the image signal Vin to provide a band-limited signal as the image signal Vin2. From this image signal Vin2, high-frequency-band noise is cancelled.

Further, in the present embodiment, band-pass filter processing is performed at the processing portion 134, so that a predetermined band component is extracted from the image signal to provide a band-limited signal as the image signal Vin1. For example, this image signal Vin1 can be obtained by, for example, extracting a period-pattern component or a high-frequency-band component working as noise from the original image signal Vin.

The processing portion 134 includes a tap selection unit 141 for selecting multiple items of pixel data of the image signal Vin input to an input terminal 103 positioned in a periphery of a target position in the image signal Vin1 based on the image signal Vin and a predictive operation unit 142 for performing multiply-and-accumulation operations on the multiple items of pixel data selected at this tap selection unit 141 and coefficient data which adds band-pass properties read out of a coefficient memory 143 to thereby generate pixel data of the target position in the image signal Vin1.

The processing portion 135 includes a tap selection unit 144 for selecting multiple items of pixel data of the image signal Vin input to the input terminal 103 positioned in a periphery of a target position in the image signal Vin2 based on the image signal Vin and a predictive operation unit 145 for performing multiply-and-accumulation operations on the multiple items of pixel data selected at this tap selection unit 144 and coefficient data which adds low-pass properties read out of a coefficient memory 146 to thereby generate pixel data of the target position in the image signal Vin2.

In the image signal processing device 110A, the processing portion 132 performs processing by using, as an input image signal, the image signal Vin1 output from the processing portion 134 in place of the image signal Vin input to the input terminal 103. Similarly, the processing portion 133 performs processing by using, as an input image signal, the image signal Vin2 output from the processing portion 135 in place of the image signal Vin input to the input terminal 103.

The other components and operations of this image signal processing device 110A are the same as those of the image signal processing device 110 shown in FIG. 1 and their detailed description is omitted.

In this image signal processing device 110A, the processing portion 135 obtains the image signal Vin2 from which high-frequency-band noise is cancelled. The processing portion 133 detects a motion class MV based on this image signal Vin2. Therefore, a motion class MV that is robust against noise can be detected. Further, the processing portion 134 obtains the image signal Vin1 that is constituted of, for example, a period pattern component or a high-frequency-band component working as noise. Therefore, the processing portion 132 may detect a space class based on this image signal Vin1, to detect a characteristic-amount class of noise.

In the above-mentioned image signal processing device 110A, similar to the processing portions 131-133, the processing portions 134 and 135 are also constituted of the ICs 10 having the same configuration (see FIG. 3).

In this case, if the IC 10 constitutes each of the processing portions 134 and 135, multiple items of pixel data positioned in the periphery of the target position in each of the image signals Vin1 and Vin2 are read out of a memory 12 based on a control signal CTLa.

Further, if the IC 10 constitutes each of the processing portions 134 and 135, ROM tables $18_{-1}$-$18_{-n}$ are switched so as to provide output data that corresponds to pixel data and coefficient data based on a control signal CTLb. In this case, to input terminals $19_{-1}$-$19_{-n}$, coefficient data for adding filter properties read out of the coefficient memories 143 and 146 are input as the coefficient data $k_1$-$k_n$.

Further, if the IC 10 constitutes each of the processing portions 134 and 135, a transfer switch 28 is connected to a fixed terminal 28b side based on a control signal CTLc. In this case, a result of multiplication of the pixel data and the coefficient data as items of output data of the ROM tables $18_{-1}$-$18_{-n}$ is obtained, so that pixel data of the target position in each of the image signals Vin1 and Vin2 is obtained well from the adder 21. The pixel data is output through an output terminal 30 via a register 22 and the fixed terminal 28b of the transfer switch 28.

In the image signal processing device 110A according to the present embodiment, besides the processing portions 131-133, the processing portions 134 and 135 are also respectively constituted of the ICs 10 having the same configuration. This allows the image signal processing device to be configured inexpensively.

The following will describe a third embodiment of the present invention. FIG. 10 shows a configuration of an image display apparatus 100B according to the third embodiment. This image display apparatus 100B also generates an image signal Vout (1050i signal) based on an image signal Vin (525i signal), to display an image based on this image signal Vout. In this FIG. 10, components corresponding to those in FIG. 2 are indicated by the same reference numbers and their detailed description is omitted.

This image display apparatus 100B has substituted an image signal processing device 110B for the image signal processing device 110 of the image display apparatus 100 shown in FIG. 2. Only this image signal processing device 110B will be described.

This image signal processing device 110B has a processing portion 136 for performing noise reduction processing on an image signal Vin input to an input terminal 103 and obtaining an image signal Vin3.

This processing portion 136 includes a tap selection unit 171 for selecting multiple items of pixel data of the image signal Vin input to the input terminal 103 positioned in a periphery of a target position in the image signal Vin3 based on the image signal Vin and a predictive operation unit 172 for performing multiply-and-accumulation operations on the multiple items of pixel data selected at this tap selection unit 171 and the coefficient data for noise reduction read out of a coefficient memory 173 and generating pixel data of the target position in the image signal Vin3.

It is to be noted that the coefficient data stored in the coefficient memory 173 beforehand can be obtained using learning processing by use of a teacher signal that corresponds to the image signal Vin3 and a student signal that corresponds to the image signal Vin.

The image signal processing device 110B also has a time-adjusting delay circuit 174 for delaying the image signal Vin input to the input terminal 103 by processing time in the above-mentioned processing portion 136 and a subtracter 175 for subtracting pixel data that constitutes the image signal Vin3 generated at the processing portion 136 from pixel data that constitutes the image signal Vin delayed at this delay circuit 174 and obtaining noise data ND that corresponds to each item of the pixel data that constitute the image signal Vin.

In the image signal processing device 110B, the processing portion 131 performs processing using the image signal Vin delayed at the delay circuit 174 in place of the image signal Vin input to the input terminal 103 as the input image signal. Similarly, the processing portion 132 performs detection processing on a space class based on noise data ND output from the subtracter 175 in place of the image signal Vin input to the input terminal 103.

It is to be noted that in this image signal processing device 110B, no processing portion for detecting a motion class MV is provided, so that a space class itself is output as a class CL at a class generation unit 125 in the processing portion 132.

The other components and operations of this image signal processing device 110B are the same as those of the image signal processing device 110 shown in FIG. 2 and their detailed description is omitted.

In this image signal processing device 110B, based on noise data ND obtained at the subtracter 175, a space class CL to which pixel data of a target position in the image signal Vout belongs is detected, so that the processing portion 131 performs multiply-and-accumulation operations by use of coefficient data Wi that corresponds to this detected class CL to generate informational data of this target position in the image signal Vout.

Therefore, even if the image signal Vin has noise, a good image signal from which the noise is cancelled can be obtained as the image signal Vout. For example, if the image signal Vin has block noise or mosquito noise, an image signal from which such noise is cancelled can be obtained as the image signal Vout.

In the above-mentioned image signal processing device 110B, the processing portions 131, 132, and 136 are respectively constituted of ICs 10 (see FIG. 3) having the same configuration.

If the IC 10 constitutes the processing portion 136, multiple items of pixel data positioned in a periphery of a target position in the image signal Vin3 are read out of a memory 12 based on a control signal CTLa.

Further, if the IC 10 constitutes the processing portion 136, ROM tables $18_{-1}$-$18_{-n}$ are switched so as to provide output data that corresponds to pixel data and coefficient data based on a control signal CTLb. In this case, to input terminals $19_{-1}$-$19_{-n}$, coefficient data for canceling noise read out of the coefficient memory 173 is input as the coefficient data, $k_1$-$k_n$.

Further, if the IC 10 constitutes the processing portion 136, a transfer switch 28 is connected to a fixed terminal 28b side based on a control signal CTLc. In this case, a result of multiplying the pixel data and the coefficient data is obtained as output data of the ROM tables $18_{-1}$-$18_{-n}$, so that pixel data of the target position in the image signal Vin3 is well obtained from the adder 21 and output through the output terminal 30 via a register 22 and the fixed terminal 28b of the transfer switch 28.

In the image signal processing device 110B according to the present embodiment, the processing portions 131, 132, and 136 are respectively constituted of the ICs 10 having the same configuration. This allows the image signal processing device 110B to be configured inexpensively.

The following will describe a fourth embodiment of the present invention. FIG. 11 shows a configuration of an image signal processing apparatus 300 according to the fourth embodiment. This image signal processing apparatus 300 performs matrix processing for obtaining a green color signal G, a blue color signal B, and a red color signal R from a luminance signal Y, a red color-difference signal R-Y, and a blue color-difference signal B-Y, respectively.

This image signal processing apparatus 300 has input terminals 301Y, 301R, and 301B each for receiving the luminance signal Y, the red color-difference signal R-Y, and the blue color-difference signal B-Y, respectively. The image signal processing apparatus 300 also has processing portions 302Y, 302R, and 302B for generating space classes CLy, CLr, and CLb based on these luminance signal Y, the red color-difference signal R-Y, and the blue color-difference signal B-Y, respectively.

The processing portion 302Y comprises a tap selection unit 303Y for selecting multiple items of pixel data (space class data) positioned in a periphery of a target position in the color signals G, B, and R based on the luminance signal Y input to the input terminal 301Y. The processing portion 302Y also comprises a class generation unit 304Y for generating a space class CLy based on the multiple items of pixel data selected at this tap selection unit 303Y.

The processing portion 302R comprises a tap selection unit 303R for selecting multiple items of pixel data (space class tap data) positioned in a periphery of a target position in the color signals G, B, and R based on the red color-difference signal R-Y input to the input terminal 301R. The processing portion 302R also comprises a class generation unit 304R for generating a space class CLr based on the multiple items of pixel data selected at this tap selection unit 303R.

The processing portion 302B comprises a tap selection unit 303B for selecting multiple items of pixel data (space class tap data) positioned in a periphery of a target position in the color signals R, G, and B based on the red color-difference signal B-Y input to the input terminal 301B. The processing portion 302B also comprises a class generation unit 304B for generating a space class CLb based on the multiple items of pixel data selected at this tap selection unit 303B.

The class generation units 304Y, 404R, and 304B each generate a space class in the same way as the above-mentioned class generation unit 125 in the processing portion 132 (see FIG. 2). It is to be noted that although the class generation unit 125 further performs processing to synthesize a space class (re-quantization code Qi) and a motion class MV, such synthesis processing is performed in none of the class generation portions 304Y, 404R, and 304B.

The image signal processing apparatus 300 has a class synthesis unit 305 for synthesizing the space classes CLy, CLr, and CLb generated at the processing portions 302Y, 302R, and 302B respectively, and obtaining one class CL.

The image signal processing apparatus 300 has coefficient memories 306G, 306B, and 306R. In each of these coefficient memories 306G, 306B, and 306R, items of coefficient data Wi (i=1 through n) of an estimate equation (see Equation (4)) is stored for each class. Each of the coefficient memories 306G, 306B, and 306R receives a class CL obtained at the class synthesis unit 305, as read address information.

In this case, the items of coefficient data Wi stored in the coefficient memories 306G, 306B, and 306R are used to obtain pixel data of the green color signal G, the blue color signal B, and the red color signal R, respectively. It is to be noted that coefficient data stored in the coefficient memories 306G, 306B, and 306R beforehand can be obtained by learning processing by use of a teacher signal that corresponds to the luminance signal Y, the red color-difference signal R-Y, and the blue color-difference signal B-Y and a student signal that corresponds to the green color signal G, the blue color signal B, and the red color signal R.

The image signal processing apparatus 300 also has a tap selection unit 307 for selecting multiple items of pixel data (prediction tap data) of the signals Y, R-B, and B-Y input to the input terminal 301Y, 301R, and 301B, respectively positioned in a periphery of a target position in the color signals G, B, and R based on the signals Y, R-B, and B-Y.

The image signal processing apparatus 300 further has predictive operation units 308G, 308B, and 308R for obtaining pixel data y at the target position in the color signals G, B, and R based on the above-mentioned Equation (4) using prediction tap data xi (i=1 through n) selected at the tap selection unit 307 and the coefficient data Wi (i=1 through n) read out of the coefficient memories 306G, 306B, and 306R. The image signal processing apparatus 300 also has output terminals 309G, 309B, and 309R for outputting the green color signal G, the blue color signal B, and the red color signal R obtained at these predictive operation units 308G, 308B, and 308R respectively.

Next, operations of the image signal processing apparatus 300 will be described.

Based on the luminance signal Y input to the input terminal 301Y, the tap selection unit 303Y selectively extracts the multiple items of pixel data (space class tap data) of the signals Y input to the terminal 301Y positioned in a periphery of the target position in the color signals G, B, and R. This space class tap data is supplied to the class generation unit 304Y. This class generation unit 304Y performs ADRC processing on each pixel data as the space class tap data, to generate a space class CLy (re-quantization code Qi) (see Equation (2)).

Similarly, the processing portion 302R generates a space class CLr based on the red color-difference signal R-Y input to the input terminal 301R, while the processing portion 302B generates a space class CLb based on the blue color-difference signal B-Y input to the input terminal 301B.

The space classes CLy, CLr, and CLb generated at the processing portions 302Y, 302R, and 302B are synthesized into one class CL at the class synthesis unit 305. The coefficient memories 306G, 306B, and 306R then receive the class CL thus obtained at the class synthesis unit 305 as read address information.

Further, based on the luminance signal Y, the red color-difference signal R-Y, and the blue color-difference signal B-Y input to the input terminals 301Y, 301R, and 301B, respectively, the tap selection unit 307 selectively extracts the multiple items of pixel data (prediction tap data) of the signals Y, R-B, and B-Y input to the input terminal 301Y, 301R, and 301B positioned in a periphery of a target position in the color signals G, B, and R. This prediction tap data xi is supplied commonly to the predictive operation units 308G, 308B, and 308R. Further, these predictive operation units 308G, 308B, and 308R receive coefficient data Wi read out of the coefficient memories 306G, 306B, and 306R, respectively.

The predictive operation units 308G, 308B, and 308R obtain pixel data y of the target position in the color signals G, B, and R based on an estimate equation (see Equation (4)) using the prediction tap data xi and the coefficient data Wi. For example, the target position in the color signals G, B, and R sequentially moves in raster scanning order so that pixel data can be sequentially generated at the moved target positions. Accordingly, the predictive operation units 308G, 308B, and 308R sequentially output items of pixel data that constitute the color signals G, B, and R in the raster scanning order through the output terminals 309G, 309B, and 309R, respectively.

In the above-mentioned image signal processing apparatus 300, the processing portions 302Y, 302R, and 302B are respectively constituted of ICs having the same configuration. The ICs in this case need only to have such a configuration as to comprise a functional block 10A and a system of a class generation unit 25 in a functional block 10B, which are present in an IC 10 shown in FIG. 3. In this case, at least one of the multiple items of pixel data selected at the processing portions 302Y, 302R, and 302B may be changed on the basis of the control signal CTLa.

In the image signal processing apparatus 300 according to the present embodiment, the processing portions 302Y, 302R, and 302B are respectively constituted of ICs having the same configuration. This allows the image signal processing apparatus to be configured inexpensively.

Although the image signal processing apparatus 300 shown in FIG. 11 is configured to perform matrix processing for the purpose of obtaining the green color signal G, the blue color signal B, and the red color signal R from the luminance signal Y, the red color-difference signal R-Y, and the blue color-difference signal B-Y respectively, it may be configured similarly to receive the color signals G, B, and R so that the numbers of their pixels may be increased to obtain new color signals G, B, and R. Such an image signal processing apparatus can be applied to such a case as to increase the number of items of pixel data for each of the color signals G, B, and R obtained by shooting by use of, for example, a single-plate type video camera.

Besides the case where the luminance signal Y, the red color-difference signal R-Y, and the blue color-difference signal B-Y or the green color signal G, the blue color signal B, and the red color signal R are input as an image signal, it may be applied similarly to such a case as to divide frequency of the signal in processing.

Although, in the above embodiments, the IC 10 (see FIG. 3) including two functional blocks has been described, the present invention is not limited thereto; for example, it may be configured similarly to include one or three or more functional blocks. Further, besides a case in which all of the functional blocks are adapted to change in functionality according to setting, only some of them may be adapted to change in functionality according to setting. In this case also, the functions can be changed to apply the functional blocks to circuit portions at a plurality of positions.

Further, although the information signal has been an image signal in the above embodiments, of course the present invention can be applied similarly to a case where the information signal is an audio signal.

Further, although the above embodiments have been described with reference to a case where the estimate equation is a linear equation of the first degree, the present invention is not limited thereto; the estimate equation may be, for example, of a higher degree.

While the foregoing specification has described preferred embodiment(s) of the present invention, one skilled in the art may make many modifications to the preferred embodiment without departing from the invention in its broader aspects. The appended claims therefore are intended to cover all such modifications as fall within the true scope and spirit of the invention.

What is claimed is:

1. An information signal processing apparatus for converting a first information signal containing multiple items of first informational data into a second information signal containing multiple items of second informational data, comprising:

a first processing portion for selecting multiple items of the first informational data positioned in a periphery of a target position in said second information signal based on said first information signal and, based on said multiple items of the first informational data thus selected, detecting a class to which the second informational data of said target position in said second information signal belongs; and a second processing portion for selecting multiple items of the first informational data positioned in a periphery of the target position in said second information signal based on said first information signal and generating second informational data of the target position in said second information signal by performing an operation using said multiple items of the first informational data thus selected and coefficient data that corresponds to the class detected by said first processing portion, wherein said first processing portion and said second processing portion are respectively constituted of integrated circuits each having the same configuration, wherein each of said integrated circuits comprises:

a first functional block for selecting multiple items of the first informational data positioned in a periphery of the target position based on the received first information signal; and a second functional block for performing processing using said multiple items of the first informational data thus selected, wherein each of said first functional block and said second functional block changes a functionality thereof according to setting.

2. An information signal processing apparatus for converting a first information signal containing multiple items of first informational data into a second information signal containing multiple items of second informational data, comprising:

a first processing portion for selecting multiple items of the first informational data positioned in a periphery of a target position in said second information signal based on said first information signal and, based on said multiple items of the first informational data thus selected, detecting a class to which the second informational data of said target position in said second information signal belongs; and a second processing portion for selecting multiple items of the first informational data positioned in a periphery of the target position in said second information signal based on said first information signal and generating second informational data of the target position in said second information signal by performing an operation using said multiple items of the first informational data thus selected and coefficient data that corresponds to the class detected by said first processing portion, wherein said first processing portion and said second processing portion are respectively constituted of integrated circuits each having the same configuration wherein said information signal is an image signal; and wherein said first processing portion comprises:
- a first class-detection processing section for selecting multiple items of the first informational data positioned in a periphery of the target position in said second information signal based on said first information signal and detecting an inter-frame difference based on said multiple items of the first informational data thus selected to detect a motion class that corresponds to said inter-frame difference thus detected; and
- a second class-detection processing section for selecting multiple items of the first informational data positioned in a periphery of the target position in said second information signal based on said first information signal and detecting a level distribution based on said multiple items of the first informational data thus selected to detect a space class that corresponds to said level distribution thus detected, and wherein said first class-detection processing section and said second class-detection processing section are respectively constituted of integrated circuits each having the same configuration.

3. An information signal processing apparatus for converting a first information signal containing multiple items of first informational data into a second information signal containing multiple items of second informational data, comprising:
- a first processing portion for performing filter processing on said first information signal to obtain a third information signal,
 wherein said first processing portion selects multiple items of the first informational data positioned in a periphery of a target position in said third information signal based on said first information signal, and performs an operation using said multiple items of the first informational data thus selected and coefficient data to generate items of third informational data of said target position in said third information signal;
- a second processing portion for selecting multiple items of the third informational data positioned in a periphery of a target position in said second information signal based on said third information signal obtained at said first processing portion and, based on the multiple items of the third informational data thus selected, detecting a class to which the second informational data of said target position in said second information signal belongs; and
- a third processing portion for selecting multiple items of the first informational data positioned in a periphery of the target position in said second information signal based on said first information signal and performing an operation using said multiple items of the first informational data thus selected and coefficient data that corresponds to the class detected at said second processing portion, to generate said second informational data of said target position in said second information signal, wherein said first processing portion, said second processing portion, and said third processing portion are respectively constituted of integrated circuits each having the same configuration.

4. The information signal processing apparatus according to claim 3, wherein each of said integrated circuits comprises:
- a first functional block for selecting multiple items of the first informational data positioned in a periphery of the target position based on the received first information signal; and
- a second functional block for performing processing using said multiple items of the first informational data thus selected, wherein each of said first functional block and said second functional block changes a functionality thereof according to setting.

5. The information signal processing apparatus according to claim 3, wherein said information signal is an image signal;

wherein said first processing portion comprises:
- a first band-limit processing section for outputting a first band-limited signal as said third information signal; and
- a second band-limit processing section for outputting a second band-limited signal as said third information signal, in which:
- said first band-limit processing section selects, based on said first information signal, multiple items of the first informational data positioned in a periphery of a target position in said first band-limited signal and performs a multiply-and-accumulation operation using said multiple items of the first informational data thus selected and coefficient data for adding a low-pass filter property to generate items of third informational data of said target position in said first band-limited signal; and
- said second band-limit processing section selects, based on said first information signal, multiple items of the first informational data positioned in a periphery of a target position in said second band-limited signal and performs a multiply-and-accumulation operation using said multiple items of the first informational data thus selected and coefficient data for adding a band-pass filter property to generate items of fourth informational data of said target position in said second band-limited signal; and wherein said second processing portion comprises:
- a first class-detection processing section for selecting, based on said first band-limited signal, the multiple items of the third informational data positioned in a periphery of the target position in said second information signal and detecting an inter-frame difference based on the multiple items of the third informational data thus selected to detect a motion class that corresponds to this detected inter-frame difference; and
- a second class-detection processing section for selecting the multiple items of the fourth informational data positioned in a periphery of the target position in said second information signal based on said second band-limited signal and detecting a level distribution based on said multiple items of the fourth informational data thus selected to detect a space class that corresponds to this detected level distribution; and wherein said first band-limit processing section, said second band-limit processing section, said first class-detection processing section, and said second class-detection processing section are respectively constituted of integrated circuits each having the same configuration.

6. An information signal processing apparatus for converting a first information signal containing multiple items of first informational data into a second information signal containing multiple items of second informational data, comprising:

a first processing portion for performing noise reduction processing on said first information signal to obtain a third information signal, wherein said first processing portion selects, based on said first information signal, multiple items of the first informational data positioned in a periphery of a target position in said third information signal and performs a multiply-and-accumulation operation using said multiple items of the first informational data thus selected and coefficient data to generate third informational data of said target position in said third information signal;

a subtracter for subtracting items of the third informational data that constitute said third information signal generated at said first processing portion from items of the first informational data that constitute said first information signal, to obtain items of noise data that respectively correspond to said items of the first informational data that constitute said first information signal;

a second processing portion for selecting multiple items of noise data positioned in a periphery of a target position in said second information signal based on said noise data obtained at said subtracter and, based on said multiple items of the noise data thus selected, detecting a class to which the second informational data of said target position in said second information signal belongs; and a third processing portion for selecting multiple items of the first informational data positioned in a periphery of the target position in said second information signal based on said first information signal and performing a multiply-and-accumulation operation using said multiple items of the first informational data thus selected and coefficient data that corresponds to the class detected at said second processing portion, to generate the second informational data of said target position in said second information signal, wherein said first processing portion, said second processing portion, and third processing portion are respectively constituted of integrated circuits each having the same configuration.

7. The information signal processing apparatus according to claim 6, wherein said integrated circuit comprises:

a first functional block for selecting multiple items of the first informational data positioned in a periphery of the target position based on the received first information signal; and a second functional block for performing processing using said multiple items of the first informational data thus selected, wherein each of said first functional block and said second functional block changes a functionality thereof according to setting.

8. An information signal processing apparatus for converting a first information signal containing multiple signal components into a second information signal containing multiple signal components, comprising:

multiple processing portions each for selecting multiple items of the first informational data positioned in a periphery of a target position in said second information signal based on each of said multiple signal components of said first information signal and detecting classes to which the items of the second informational data of said target position in said second information signal belong based on said multiple items of the first informational data thus selected;

a class synthesis portion for synthesizing said classes detected at said multiple processing portions to generate one class;

a data selection portion for selecting said multiple items of the first informational data positioned in a periphery of the target position in said second information signal based on said multiple signal components of said first information signal; and multiple arithmetic operation portions each for performing an operation using said multiple items of the first informational data selected at said data selection portion and different items of coefficient data corresponding to said class generated at said class synthesis portion, to generate the second informational data of the target position in said multiple signal components of said second information signal, wherein said multiple processing portions are respectively constituted of integrated circuits each having said same configuration.

* * * * *